US010452015B2

(12) United States Patent
Ishikawa et al.

(10) Patent No.: US 10,452,015 B2

(45) Date of Patent: Oct. 22, 2019

(54) METHOD OF CONTROLLING TARGET SPEED OF ROTATING MEMBER USED IN IMAGE FORMING APPARATUS

(71) Applicant: CANON KABUSHIKI KAISHA, Tokyo (JP)

(72) Inventors: Rin Ishikawa, Ushiku (JP); Tadashi Iwakawa, Tokyo (JP); Koichi Taniguchi, Tokyo (JP); Akira Hamano, Kashiwa (JP)

(73) Assignee: Canon Kabushiki Kaisha, Tokyo (JP)

( * ) Notice: Subject to any disclaimer, the term of this patent is extended or adjusted under 35 U.S.C. 154(b) by 0 days.

(21) Appl. No.: 16/157,342

(22) Filed: Oct. 11, 2018

(65) Prior Publication Data

US 2019/0041783 A1 Feb. 7, 2019

Related U.S. Application Data

(63) Continuation of application No. 15/627,976, filed on Jun. 20, 2017, now Pat. No. 10,146,163.

(30) Foreign Application Priority Data

Jul. 12, 2016 (JP) ................................ 2016-137958
Jul. 13, 2016 (JP) ................................ 2016-138231

(51) Int. Cl.

*H04N 1/36* (2006.01)
*G03G 15/00* (2006.01)
*G03G 15/01* (2006.01)

(52) U.S. Cl.

CPC ..... *G03G 15/5008* (2013.01); *G03G 15/0136* (2013.01); *G03G 15/0163* (2013.01); *G03G 15/0189* (2013.01); *G03G 15/757* (2013.01)

(58) Field of Classification Search

None

See application file for complete search history.

(56) References Cited

U.S. PATENT DOCUMENTS

2008/0298856 A1* 12/2008 Koike .................. G03G 15/167 399/302
2010/0008689 A1* 1/2010 Iwasaki ................ G03G 15/167 399/66

(Continued)

FOREIGN PATENT DOCUMENTS

JP 2009-294312 A 12/2009

*Primary Examiner* — Henok Shiferaw

(74) *Attorney, Agent, or Firm* — Venable LLP

(57) ABSTRACT

When a mechanism enters a first state, an intermediate transfer member separates from a second photosensitive member. When the mechanism enters a second state, the intermediate transfer member contacts the second photosensitive member. When a first monochrome image is formed on a sheet of a first type by using toner of a first color, the mechanism enters the first state. When a second monochrome image is formed on a sheet of a second type by using toner of the first color, the mechanism enters the second state. A rotation speed of the second photosensitive member for forming the second monochrome image on the sheet of the second type is controlled to a predetermined rotation speed. The predetermined rotation speed is slower than a rotation speed of the second photosensitive member for forming the second image.

10 Claims, 15 Drawing Sheets

(56) References Cited

U.S. PATENT DOCUMENTS

| | | | | |
|---|---|---|---|---|
| 2011/0026980 | A1* | 2/2011 | Mizushima .......... | G03G 15/161 399/301 |
| 2011/0129241 | A1* | 6/2011 | Tomioka ........... | G03G 15/5008 399/36 |
| 2015/0362867 | A1 | 12/2015 | Okumura | |
| 2016/0259275 | A1 | 9/2016 | Iwakawa et al. | |

* cited by examiner

METHOD OF CONTROLLING TARGET SPEED OF ROTATING MEMBER USED IN IMAGE FORMING APPARATUS

This application is a continuation application of U.S. patent application Ser. No. 15/627,976, filed Jun. 20, 2017, which claims the benefit of Japanese Patent Application No. 2016-137958, filed Jul. 12, 2016, and Japanese Patent Application No. 2016-138231, filed Jul. 13, 2016, which are hereby incorporated by reference herein in their entirety.

BACKGROUND OF THE INVENTION

Field of the Invention

The present invention relates to a method of controlling a target speed of a rotating member used in an image forming apparatus.

Description of the Related Art

An image forming apparatus that forms a mixed-color image primary transfers a toner image formed on a photosensitive drum to an intermediate transfer belt, and also secondary transfers the toner image from the intermediate transfer belt to a sheet. When thick paper having a larger grammage than normal paper is supplied to a secondary transfer unit as a sheet, a load put on an intermediate transfer belt changes, and a shock image may occur in a primary transfer unit. Such a shock image easily occurs in an image forming apparatus that has a multicolor mode and a monocolor mode and causes an intermediate transfer belt to separate from a plurality of photosensitive drums that form toner images of colors other than black in the monocolor mode. In the multicolor mode, there tends not to be an influence of a variation of load because a plurality of photosensitive drums are in contact with the intermediate transfer belt, but, in the monocolor mode, because only the photosensitive drum for black is in contact with the intermediate transfer belt, there tends to be an influence of a variation of load. Japanese Patent Laid-Open No. 2009-294312 recites reducing shock images by arranging a contacting member that nips the intermediate transfer belt between a photosensitive drum for black and a photosensitive drum for cyan, and continuously applying a load to the intermediate transfer belt by the contacting member.

However, in accordance with Japanese Patent Laid-Open No. 2009-294312, a dedicated contacting member for reducing shock images is necessary, leading to increased size and complexity of the image forming apparatus.

SUMMARY OF THE INVENTION

The present invention reduces shock images in accordance with a simpler configuration.

The present invention provides an image forming apparatus having an intermediate transfer member that transfers an image on the intermediate transfer member to a sheet. The apparatus may comprise the following elements. A first image forming unit is configured to use toner of a first color to form a first image on a first photosensitive member. A second image forming unit is configured to use toner of a second color that is different from the first color to form a second image on a second photosensitive member. A driving control unit is configured to control a rotation speed of the second photosensitive member. A first transferring member is configured to form a first transferring nip portion for transferring the first image formed on the first photosensitive member to the intermediate transfer member. A second transferring member is configured to form a second transferring nip portion for transferring the second image formed on the second photosensitive member to the intermediate transfer member. A controller is configured to control a mechanism for causing contact and separation of the second photosensitive member and the intermediate transfer member. In a case where the mechanism is controlled to enter a first state, the intermediate transfer member separates from the second photosensitive member. In a case where the mechanism is controlled to enter a second state, the intermediate transfer member contacts the second photosensitive member. In a case where a first monochrome image is formed on a sheet of a first type by using the toner of the first color, the controller controls the mechanism to enter the first state. In a case where a second monochrome image is formed on a sheet of a second type that is different from the first type by using the toner of the first color, the controller controls the mechanism to enter the second state. The driving control unit controls a rotation speed of the second photosensitive member for forming the second monochrome image on the sheet of the second type to a predetermined rotation speed. The predetermined rotation speed is slower than a rotation speed of the second photosensitive member for forming the second image.

Further features of the present invention will become apparent from the following description of exemplary embodiments (with reference to the attached drawings).

DESCRIPTION OF THE EMBODIMENTS

[Configuration of Image Forming Apparatus]

Figure 1A:
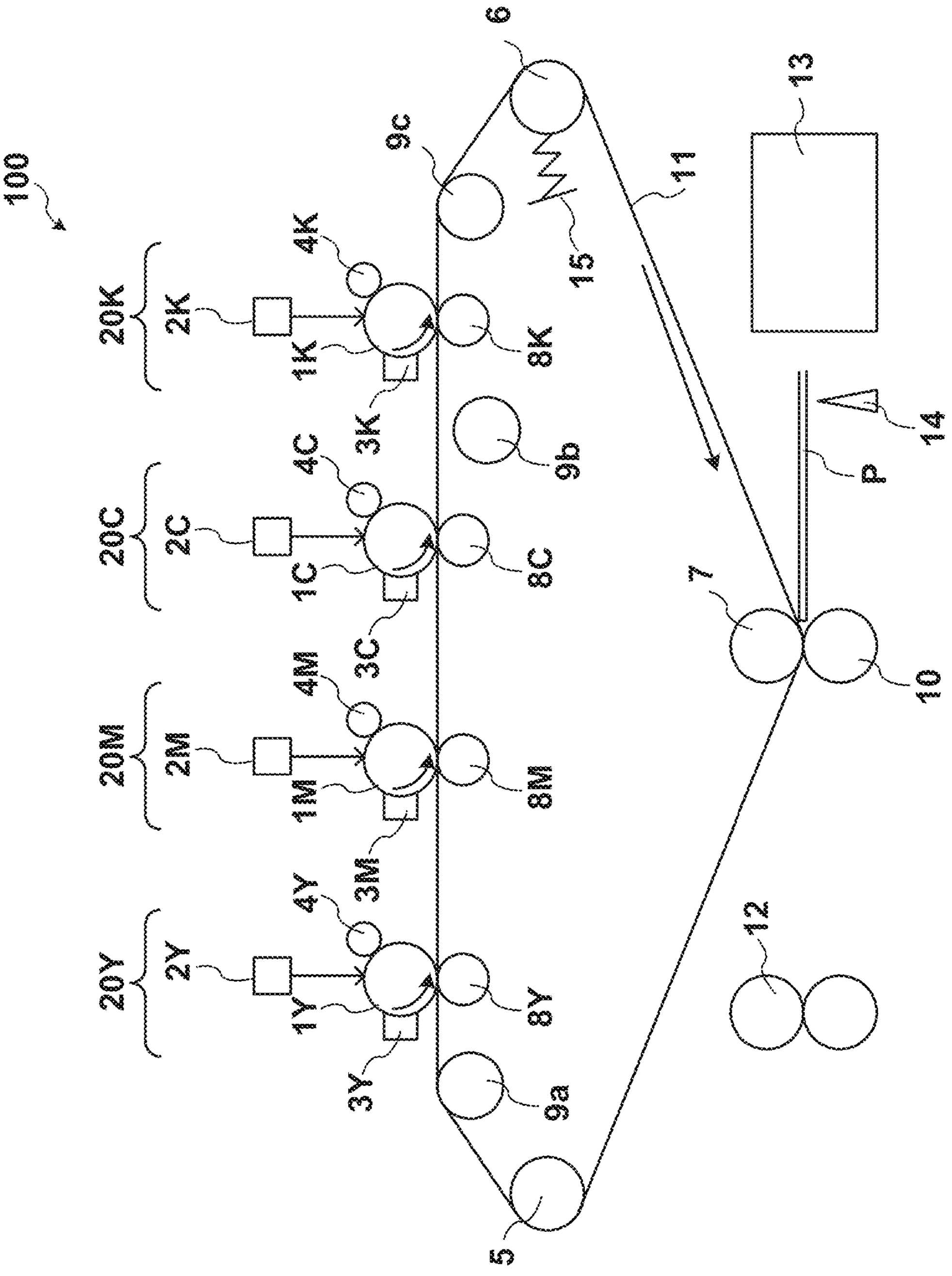
FIGS. 1A and 1B are overview cross-sectional views that illustrate an image forming apparatus.

FIG. 1A illustrates an electrophotographic image forming apparatus 100. The image forming apparatus 100 has a multicolor mode (a first mode) and a monocolor mode (a second mode). The monocolor mode is an image forming mode for forming a monochrome image by using black (K) toner. The multicolor mode is an image forming mode for forming a mixed-color image by appropriately using toner of each of yellow (Y), magenta (M), cyan (C), and black. The monocolor mode is an image forming mode for forming a monochrome image by using black (K) (a first color) toner. Each of YMC is a second color. The characters YMCK, which indicate a color, are added to the end of reference numerals in FIG. 1A and FIG. 1B, but the characters YMCK are omitted when explanation is given for matter common to the four colors. The image forming apparatus 100 has four image forming units. A black image forming unit 20K forms a black toner image (a first image). A yellow image forming unit 20Y forms a yellow toner image (a second image). A magenta image forming unit 20M forms a magenta toner image (a second image). A cyan image forming unit 20C forms a cyan toner image (a second image). Toner may be referred to as color material or a developing agent. Each image forming unit has a photosensitive drum 1, an exposure unit 2, a developer 3, a charger 4, and a primary transfer roller 8.

The photosensitive drum 1 is an image carrier that carries an electrostatic latent image or a toner image. A photosensitive layer is formed on a surface of the photosensitive drum 1. In other words, the photosensitive drum 1 functions as a photosensitive member. The charger 4 uniformly charges a surface of the photosensitive drum 1. The exposure unit 2 has a light source for outputting a laser beam in accordance with image information, and a deflector for deflecting the laser beam so that the laser beam scans the photosensitive drum 1. An electrostatic latent image corresponding to the image information is formed by the laser beam scanning the photosensitive drum 1. The developer 3 uses toner to develop the electrostatic latent image and form a toner image. The primary transfer roller 8 is arranged so as to face the photosensitive drum 1, and nips an intermediate transfer belt 11 in cooperation with the photosensitive drum 1. The primary transfer roller 8, by a primary transfer voltage being applied thereto, primary transfers the toner image on the photosensitive drum 1 to the intermediate transfer belt 11. The photosensitive drum 1 and the primary transfer roller 8 which is arranged opposite thereto, configure a primary transfer unit. For example, the photosensitive drum 1K and the primary transfer roller 8K form a first transferring nip portion. The primary transfer roller 8K functions as a first transferring member that forms a first transferring nip portion for transferring a black image formed on the photosensitive drum 1K to the intermediate transfer belt 11. The photosensitive drums 1Y, 1M, and 1C and the primary transfer rollers 8Y, 8M, and 8C respectively form second transferring nip portions. Each of the primary transfer rollers 8Y, 8M, and 8C functions as a second transferring member that forms a second transferring nip portion for transferring a chromatic color (yellow, magenta, cyan) image respectively formed on the photosensitive drums 1Y, 1M, and 1C to the intermediate transfer belt 11. In this way, a toner image formed on the first photosensitive member or a second photosensitive member is transferred to the intermediate transfer belt 11 (an intermediate transfer member). A toner image transferred to the intermediate transfer belt 11 (a first image or a second image) is secondary transferred to a sheet P by a secondary transfer unit. The sheet P may be referred to as a recording material, a recording medium, a sheet, a transfer material, or a transfer sheet. A fixing device 12 fixes a toner image transferred to the sheet P by applying heat and pressure. Note that the sheet P is fed from a feeding apparatus 13 and supplied to the secondary transfer unit. The feeding apparatus 13 has a paper feed cassette, a paper feed roller, and the like. Note that a grammage sensor 14 for measuring a grammage of a sheet may be arranged on a conveyance path from the feeding apparatus 13 to the secondary transfer unit. The grammage sensor 14 can be configured by an ultrasonic transmitter and an ultrasonic receiver, for example.

The intermediate transfer belt 11 is stretched over a driving roller 5, a tension roller 6, an internal roller 7, and the primary transfer roller 8. As illustrated in FIG. 1A, auxiliary rollers 9*a*, 9*b*, and 9*c* may be employed. The driving roller 5 is driven by a motor to rotate, and transfers a driving force from the motor to the intermediate transfer belt 11 to cause the intermediate transfer belt 11 to rotate. The tension roller 6 is biased by a biasing mechanism 15 such as a spring, and provides appropriate tension to the intermediate transfer belt 11. The internal roller 7 is arranged opposite an external roller 10, and cooperates with the external roller 10 to nip the intermediate transfer belt 11. The internal roller 7 configures the secondary transfer unit together with the external roller 10. In addition, the intermediate transfer belt 11 and the external roller 10 form a third transferring nip portion. The auxiliary rollers 9*a* and 9*b* can move up/down, and are in contact with an inner circumferential surface of the intermediate transfer belt 11 to support the intermediate transfer belt 11 or separate from the inner circumferential surface. In FIG. 1A, the auxiliary roller 9*a* is in contact with and supports the intermediate transfer belt 11, but the auxiliary roller 9*b* is separated from the intermediate transfer belt 11. The auxiliary roller 9*c* is a roller whose rotation shaft does not move up/down.

Figure 1B:
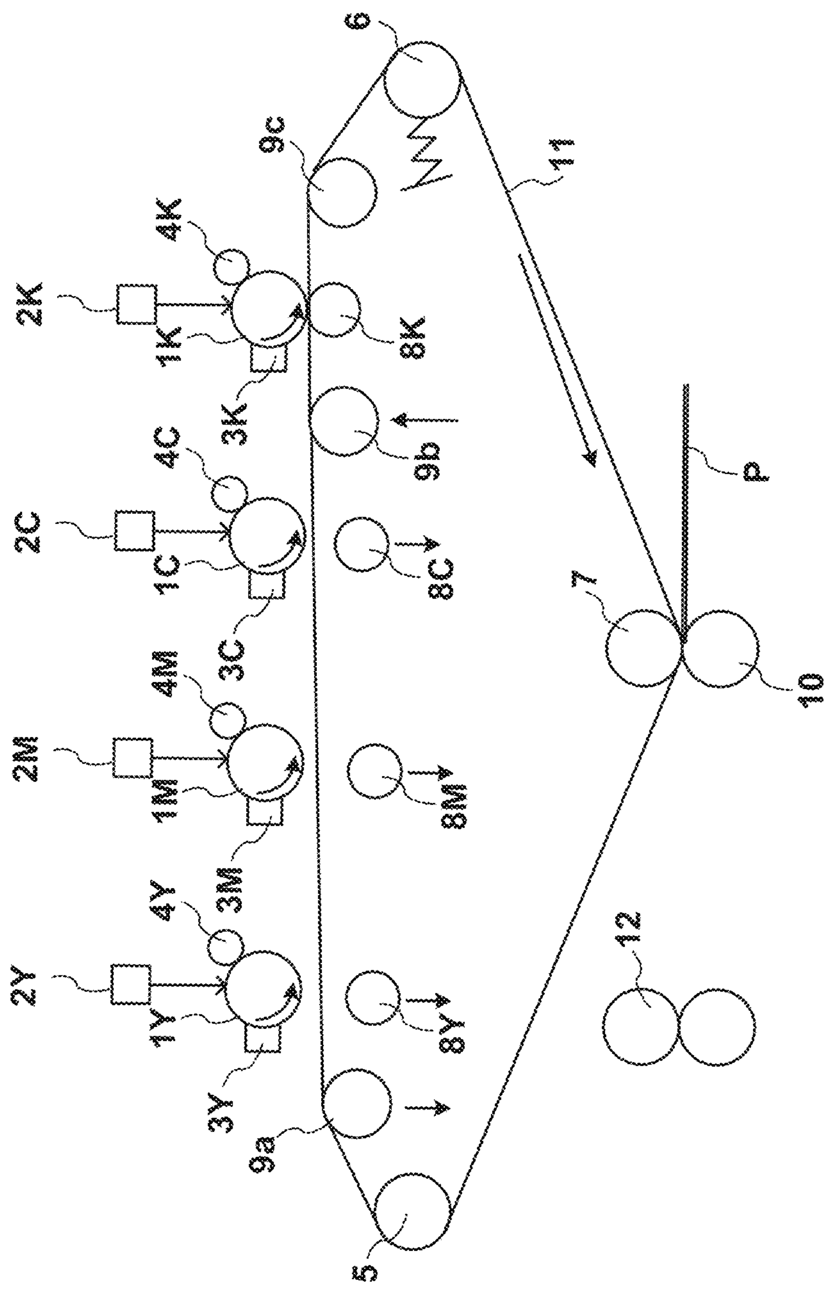

FIG. 1A illustrates a state of contact in which the primary transfer rollers 8Y, 8M, and 8C are in contact with the intermediate transfer belt 11. The state of contact is employed when the multicolor mode is set, but in the present embodiment, it is also employed when thick paper is fed in the monocolor mode. FIG. 1B illustrates a separated state in which the primary transfer rollers 8Y, 8M, and 8C are separated from the intermediate transfer belt 11. The separated state is employed when normal paper is fed in the monocolor mode.

In the state of contact, the auxiliary roller 9*a* and the auxiliary roller 9*b* are positioned at respective initial positions. As illustrated by FIG. 1A, the auxiliary roller 9*a* is in contact with the intermediate transfer belt 11, but the auxiliary roller 9*b* is separated from the intermediate transfer belt 11. In addition, the primary transfer rollers 8Y, 8M, and 8C are positioned at initial positions, and are in contact with the inner circumferential surface of the intermediate transfer belt 11. The intermediate transfer belt 11 is lifted upward by the auxiliary roller 9*a* and the primary transfer rollers 8Y, 8M, and 8C, and is in contact with the photosensitive drums 1Y, 1M, 1C, and 1K. A yellow toner image is transferred at a transferring nip portion (the second transferring nip portion) between the photosensitive drum 1Y and the intermediate transfer belt 11. Similarly, a magenta toner image is transferred at a transferring nip portion (the second transferring nip portion) between the photosensitive drum 1M and the intermediate transfer belt 11. A cyan toner image is transferred at a transferring nip portion (the second transferring nip portion) between the photosensitive drum 1C and the intermediate transfer belt 11. A black toner image is transferred at a transferring nip portion (the first transferring nip portion) between the photosensitive drum 1K and the intermediate transfer belt 11.

In the separated state, the auxiliary roller 9*a* descends from the initial position, and the auxiliary roller 9*b* rises from the initial position. As illustrated by FIG. 1B, by the auxiliary roller 9*a* descending and the auxiliary roller 9*b* rising, the auxiliary roller 9*b* contacts with the intermediate transfer belt 11. In addition, the primary transfer rollers 8Y, 8M, and 8C descend from the initial positions to separate from the intermediate transfer belt 11. Accordingly, the intermediate transfer belt 11 separates from the photosensitive drums 1Y, 1M, and 1C while staying in contact with the photosensitive drum 1K. The auxiliary roller 9*b* rising is to maintain the height of the intermediate transfer belt 11 in the black image forming unit 20K at a height where the photosensitive drum 1K and the primary transfer roller 8K nip the intermediate transfer belt 11.

[Contact and Separation Mechanism]

Figure 2A:
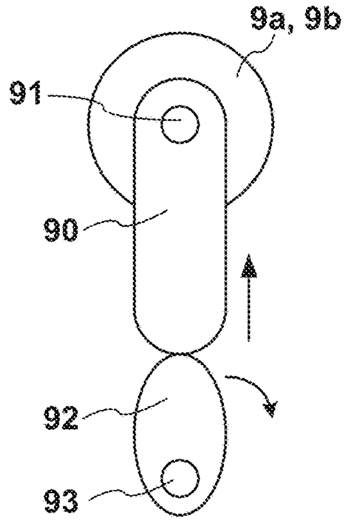
FIGS. 2A to 2D are views illustrating a contact and separation mechanism.
Figure 2B:
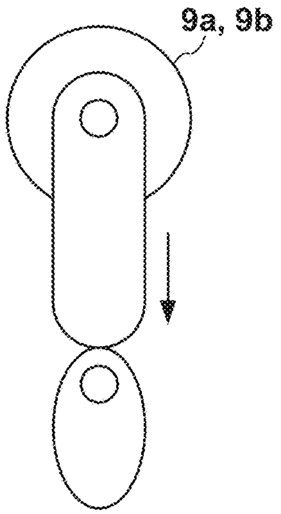

FIG. 2A and FIG. 2B illustrate a contact and separation mechanism of the auxiliary rollers 9*a* and 9*b*. The configurations of the contact and separation mechanism of the auxiliary roller 9*a* and the contact and separation mechanism of the auxiliary roller 9*b* may be different or may be the same. Here it is assumed that both are the same, and explanation is given regarding the auxiliary roller 9*a*. Near one end of a follower 90, a rotation shaft 91 of the auxiliary roller 9*a* is rotatably supported. The other end of the follower 90 is in contact with a cam 92, and the follower 90 goes up and down following the profile of the cam 92. In other words, the auxiliary roller 9*a* goes up and down. The cam 92 is joined to a rotation shaft 93 of the motor, and rotates by being driven by the motor. The rotation shaft 93 may be a rotation shaft that is linked to the rotation shaft of the motor via a gear. FIG. 2A illustrates a state in which the auxiliary rollers 9*a* and 9*b* have been lifted to a highest position. FIG. 2B illustrates a state in which the auxiliary rollers 9*a* and 9*b* have been lowered to a lowest position.

Figure 2C:
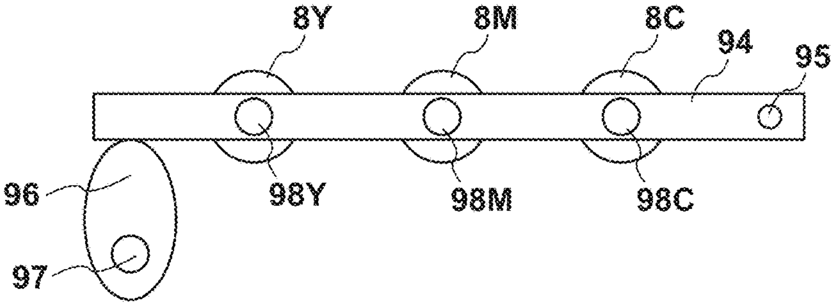
Figure 2D:
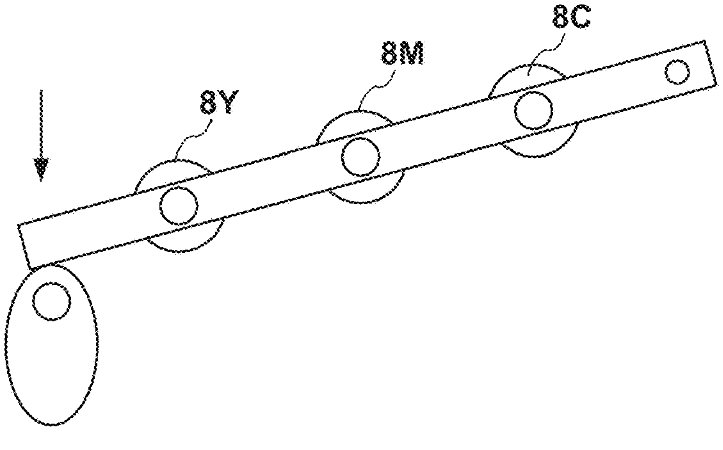

FIG. 2C and FIG. 2D illustrate a contact and separation mechanism of the primary transfer rollers 8Y, 8M, and 8C. A fixed axis 95 is provided near one end of a follower 94, and the follower 94 rotates centered on the fixed axis 95. A central portion of the follower 94 rotatably supports a rotation shaft 98Y of the primary transfer roller 8Y, a rotation shaft 98M of the primary transfer roller 8M, and a rotation shaft 98C of the primary transfer roller 8C. A cam 96 is in contact with the follower 94 near the other end thereof. The follower 94 goes up and down following the profile of the cam 96. In other words, the primary transfer rollers 8Y, 8M, and 8C go up and down. The cam 96 is joined to a rotation shaft 97 of the motor, and rotates by being driven by the motor. The follower 94, the cam 96, and the motor that causes the cam 96 to rotate configure a mechanism for causing contact and separation between the photosensitive drums 1Y, 1M, and 1C and the intermediate transfer belt 11. FIG. 2C illustrates a state in which the primary transfer rollers 8Y, 8M, and 8C have been lifted to a highest position (the state of contact). FIG. 2D illustrates a state (a separated state) in which the primary transfer rollers 8Y, 8M, and 8C have been lowered to a lowest position.

[Control System]

Figure 3:
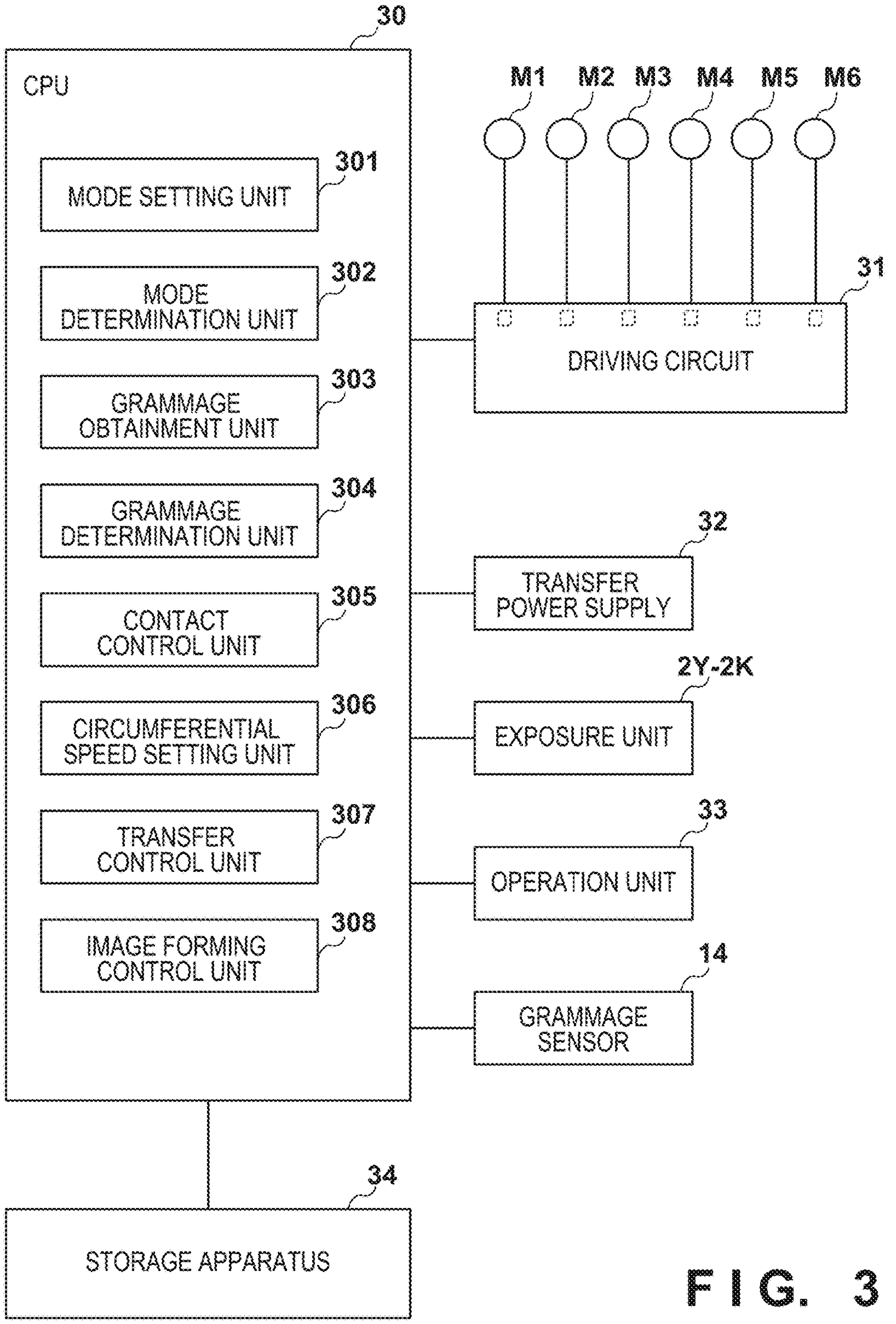
FIG. 3 is a view illustrating a control system.

FIG. 3 illustrates a control system that controls the image forming apparatus 100. A CPU 30 is a processor or controller that realizes various functions by executing a control program stored in a storage apparatus 34. Some or all of these functions may be realized by hardware such as an ASIC or an FPGA. ASIC is an abbreviation for application specific integrated circuit. FPGA is an abbreviation for field-programmable gate array.

A driving circuit 31 is a driving control unit that drives a driving source such as motors M1 through M5 in accordance with an instruction from the CPU 30. For example, the driving circuit 31 executes feedback control such that respective rotation speeds of the motors M1 through M5 becomes respective target speeds set by the CPU 30. Note that a plurality of sub circuits may be provided inside the driving circuit 31. In other words, each sub circuit may function as a driving control unit for drive control of a motor out of the motors M1 through M5 that it itself is responsible for. The motor M1 causes the auxiliary roller 9*a* to rise/lower. The motor M2 causes the auxiliary roller 9*b* to rise/lower. The motor M3 causes the primary transfer rollers 8Y, 8M, and 8C to rise/lower. The motor M4 drives the driving roller 5. The motor M5 drives the photosensitive drum 1K. The motor M6 drives the photosensitive drums 1Y, 1M, and 1C. An encoder (sensor) is provided at a rotation shaft of the driving roller 5 which is rotated by the motor M4. The driving circuit 31 controls a current value flowing to the motor M4 so that a circumferential speed of the intermediate transfer belt 11 reaches a target speed Vrefb from a rotation speed of the driving roller 5 that is detected by the encoder. In other words, the driving circuit 31 performs feedback control for the motor M4 based on the circumferential speed of the intermediate transfer belt 11. An encoder (a first sensor) is provided at a rotation shaft of the photosensitive drum 1K which is rotated by the motor M5. The driving circuit 31 controls a current value flowing to the motor M5 so that a circumferential speed that is detected by the encoder of the photosensitive drum 1K reaches a target speed Vref1. In other words, the driving circuit 31 performs feedback control for the motor M5 based on the circumferential speed of the photosensitive drum 1K. The motor M6 may include a motor M6*y* that rotates the photosensitive drum 1Y, a motor M6*m* that rotates the photosensitive drum 1M, and a motor M6*c* that rotates the photosensitive drum 1C. In the following explanation, the motors M6*y*, M6*m*, and M6*c* are collectively described as the motor M6. Note that an encoder (a second sensor) is provided at each rotation shaft of the photosensitive drums 1Y, 1M, and 1C which are rotated by the motor M6. Details of the encoder are explained later using FIG. 11. The driving circuit 31 controls a current value flowing to the motor M6*y* so that a circumferential speed that is detected by the encoder of the photosensitive drum 1Y reaches a target speed Vref2*y*. Similarly, the driving circuit 31 controls a current value flowing to the motor M6*m* so that the circumferential speed of the photosensitive drum 1M which is detected by the encoder becomes a target speed Vref2*m*. Furthermore, the driving circuit 31 controls a current value flowing to the motor M6*c* so that the circumferential speed of the photosensitive drum 1C which is detected by the encoder becomes a target speed Vref2*c*. In other words, the driving circuit 31 performs feedback control for the motors M6*y*, M6*m*, and M6*c* based on the circumferential speeds of the photosensitive drums 1Y, 1M, and 1C.

A transfer power supply 32 is a power supply that supplies a transfer voltage for promoting a primary transfer for each of the primary transfer rollers 8Y, 8M, 8C, and 8K. An operation unit 33 has an input apparatus and an output apparatus, and accepts an instruction for image formation, and accepts information relating to a grammage of a sheet.

When a multicolor mode is set through the operation unit 33, the CPU 30 controls the motors M1, M2, and M3 through the driving circuit 31 to cause the photosensitive drum 1K and the photosensitive drums 1Y, 1M, and 1C to be in contact with the intermediate transfer belt 11. In addition, when a monocolor mode is set through the operation unit 33 and a sheet (example: normal paper) having a grammage of less than or equal to a predetermined value is supplied, the CPU 30 controls the motors M1, M2, and M3 through the driving circuit 31 to cause the intermediate transfer belt 11 to separate from the photosensitive drums 1Y, 1M, and 1C.

When a monocolor mode is set through the operation unit 33 and a sheet (example: thick paper) having a grammage exceeding the predetermined value is supplied, the CPU 30 controls the motors M1, M2, and M3 through the driving circuit 31 to cause the intermediate transfer belt 11 to be in contact with the photosensitive drums 1Y, 1M, and 1C. The driving circuit 31 functions as a controller for controlling the contact and separation mechanism. Accordingly, even if a thick paper is supplied in the monocolor mode, a variation of load with respect to the photosensitive drum 1K becomes small, and it is harder for a shock image to occur. In addition, when normal paper is supplied in the monocolor mode, because the intermediate transfer belt 11 is separated from the photosensitive drums 1Y, 1M, and 1C, it is possible to reduce wear of the photosensitive drums 1Y, 1M, and 1C. Note that configuration may be taken such that, when thick paper is supplied in the monocolor mode, the CPU 30 supplies a transfer voltage to the primary transfer roller 8K, but does not supply a transfer voltage to the primary transfer rollers 8Y, 8M, and 8C. In addition, the CPU 30 may control the circumferential speed of the photosensitive drums 1Y, 1M, and 1C in accordance with a combination of the grammage of a sheet P and a color mode (an image forming mode).

A mode setting unit 301 accepts a setting of a color mode that is inputted from the operation unit 33 or the like. A mode determination unit 302 determines whether the set color mode is the multicolor mode. A grammage obtainment unit 303 obtains a grammage of the sheet P by using the operation unit 33, the grammage sensor 14, or the like. A grammage determination unit 304 determines whether the grammage of the sheet P exceeds a predetermined value (whether the sheet P is a thick paper). The predetermined value is stored in the storage apparatus 34. By causing the primary transfer rollers 8Y, 8M, and 8C to go up or down, a contact control unit 305 causes the intermediate transfer belt 11 to be in contact with or separated from the photosensitive drums 1Y, 1M, and 1C. A circumferential speed setting unit 306 sets a circumferential speed of the photosensitive drums 1Y, 1M, 1C, and 1K. Note that, because the circumferential speed of the photosensitive drums 1Y, 1M, 1C, and 1K is proportional to the rotation speed of the motor M5, it means that the rotation speed of the motor M5 (a target speed) is set. In other words, the circumferential speed setting unit 306 functions as a change unit for changing the target speed of a rotation speed (a circumferential speed of a photosensitive member) of respective motors for respectively driving the photosensitive drums 1Y, 1M, 1C, and 1K. The circumferential speed in each mode is stored in the storage apparatus 34. A transfer control unit 307 controls a transfer voltage supplied to the primary transfer rollers 8Y, 8M, 8C, and 8K through the transfer power supply 32. An image forming control unit 308 controls exposure units 2Y, 2M, 2C, and 2K or the like to form a toner image.

[Monocolor Mode]

As examples of a sheet P, "normal paper" whose grammage is a predetermined value or less, and "thick paper" whose grammage exceeds the predetermined value are employed. Note that an image forming mode in which an image is formed on normal paper may be referred to as a "normal paper mode", and a mode in which an image is formed on thick paper may be referred to as a "thick paper mode". In other words, the image forming apparatus has a monocolor mode for forming an image on normal paper and a monocolor mode for forming an image on thick paper. The predetermined value is, for example, 129 [g/m^2]. m^2 indicates a square meter.

Normal Paper Mode

As illustrated in FIG. 1B, in the normal paper mode, the CPU 30 lowers the primary transfer rollers 8Y, 8M, and 8C and the auxiliary roller 9*a*. By this, the intermediate transfer belt 11 separates from the photosensitive drums 1Y, 1M, and 1C. Wear-and-tear of the photosensitive drums 1Y, 1M, and 1C and the primary transfer rollers 8Y, 8M, and 8C is suppressed, and lengthening of the life span of parts is achieved.

Thick Paper Mode

As illustrated in FIG. 1A, in the thick paper mode, the CPU 30 raises the primary transfer rollers 8Y, 8M, and 8C and the auxiliary roller 9*a*. By this, the intermediate transfer belt 11 is in contact with the photosensitive drums 1Y, 1M, and 1C. The CPU 30 does not apply the transfer voltage to the primary transfer rollers 8Y, 8M, and 8C. Accordingly, wear-and-tear of the photosensitive drums 1Y, 1M, and 1C and the primary transfer rollers 8Y, 8M, and 8C is suppressed. However, the transfer voltage may be applied to the primary transfer rollers 8Y, 8M, and 8C.

Explanation is given regarding a reason for the intermediate transfer belt 11 being in contact with the photosensitive drums 1Y, 1M, and 1C when thick paper is supplied in the monocolor mode. When the sheet P enters the secondary transfer unit, a load of the intermediate transfer belt 11 varies, and accordingly the circumferential speed of the intermediate transfer belt 11 changes. As a result, a position at which a toner image is transferred from the photosensitive drum 1 to the intermediate transfer belt (a primary transfer position) ends up being misaligned from an ideal position. This leads to a shock image. In particular, in the thick paper mode where the grammage of the sheet P is high, an amount of a variation of load of the intermediate transfer belt 11 becomes larger compared to in the normal paper mode. In other words, it is easier for a shock image to occur in the thick paper mode in comparison to the normal paper mode. In the monocolor mode, by the photosensitive drums 1Y, 1M, and 1C which are not involved in image formation being separated from the intermediate transfer belt 11, a longer life span can be achieved. However, when the photosensitive drums 1Y, 1M, and 1C are separated from the intermediate transfer belt 11, a constraint force of the intermediate transfer belt 11 becomes smaller. In other words, when the intermediate transfer belt 11 separates from the photosensitive drums 1Y, 1M, and 1C in the "thick paper mode" where the amount of variation of load is large, it is even easier for a shock image to occur. Accordingly, in the present embodiment, when thick paper is supplied in the monocolor mode, the photosensitive drums 1Y, 1M, and 1C and the primary transfer rollers 8Y, 8M, and 8C contact with the intermediate transfer belt 11. Because a constraint force becomes large if the photosensitive drums 1Y, 1M, and 1C and the primary transfer rollers 8Y, 8M, and 8C are in contact with the intermediate transfer belt 11, variation of the circumferential speed of the intermediate transfer belt 11 becomes smaller, and thereby the occurrence of shock images is reduced.

[Relation Between Roller Arrangement and Circumferential Speed Difference]

To increase the constraint force of the intermediate transfer belt 11, the image forming apparatus 100 causes the target value of the circumferential speed of the photosensitive drums 1Y, 1M, and 1C to be lower in the thick paper mode. Explanation is given below regarding an arrangement of rollers involved with the intermediate transfer belt 11, and a circumferential speed difference between the photosensitive drum 1 and the intermediate transfer belt 11. Note that, to cause the constraint force of the intermediate transfer belt 11 to increase, the circumferential speed of the photosensitive drums 1Y, 1M, and 1C may be set so that a torque of the motor M4 that drives the intermediate transfer belt 11 increases.

Transfer Unit in which the Primary Transfer Roller 8 is Arranged Downstream of the Driving Roller 5

As illustrated in FIG. 1A, the primary transfer roller 8 and the tension roller 6 are arranged on a downstream side of the driving roller 5. Here downstream is in reference to the rotation direction of the intermediate transfer belt 11 (a direction of movement of the outer circumferential surface). The CPU 30 controls the motors M4 and M5 so that a circumferential speed difference X obtained by subtracting the circumferential speed of the intermediate transfer belt 11 from the circumferential speed of the photosensitive drum 1 is a positive value. Specifically, the photosensitive drum 1 rotates faster than the intermediate transfer belt 11. In a transfer unit in which the primary transfer roller 8 is arranged on a downstream side of the driving roller 5, if the circumferential speed difference X becomes a negative value, there is a possibility that slack of the intermediate transfer belt 11 will occur in the primary transfer unit, lowering transfer accuracy. In a transfer unit in which the circumferential speed of the intermediate transfer belt 11 and the circumferential speed of the photosensitive drum 1 match, transferring that relies on electrostatic force is performed. Meanwhile, in a transfer unit where the circumferential speed difference X is positive, because a mechanical peeling force is added in addition to an electrostatic force, transferring is promoted. A circumferential speed difference (%) for promoting transferring is set to be approximately 0.05% to 3%, for example. This value is obtained by dividing the circumferential speed difference X by the circumferential speed of the intermediate transfer belt 11, and multiplying the quotient by 100.

Furthermore, the CPU 30 may change the circumferential speed difference X between the photosensitive drums 1Y, 1M, and 1C and the intermediate transfer belt 11, between the multicolor mode and the monocolor normal paper mode. In such a case the following relationship is established.

$$0\% \leq X1 < X2 \quad (1)$$

Here X1 is the circumferential speed difference X applied in the monocolor normal paper mode. X2 is the circumferential speed difference X applied in the multicolor mode (the same circumferential speed difference is applied for thick paper and normal paper). However, it is assumed that the circumferential speed differences X1 and X2 are represented in parts per hundred in Equation (1). By setting the circumferential speed difference X1 such that this condition is satisfied, the occurrence of shock images is reduced. Specifically, in a system where the photosensitive drum 1 is rotating faster than the intermediate transfer belt 11, the photosensitive drum 1 rotates while assisting the intermediate transfer belt 11. Therefore, the faster the rotation speed of the photosensitive drum 1, the smaller rotational torque of the intermediate transfer belt 11 becomes. Conversely, the slower the rotation speed of the photosensitive drum 1 (the closer the circumferential speed difference comes to 0%), the larger the rotational torque of the intermediate transfer belt 11 becomes. In other words, the speed variation of the intermediate transfer belt 11 when the sheet P has entered the secondary transfer unit becomes small. The CPU 30 aims to promote transfer by setting the circumferential speed difference X of the photosensitive drum 1K that forms a black toner image to a value greater than 0%. Meanwhile, the CPU 30 makes the circumferential speed difference X of the photosensitive drums 1Y, 1M, and 1C that do not form toner images approach 0%. Accordingly, it becomes harder for a shock image to occur in the monocolor thick paper mode. In the present embodiment, the circumferential speed difference X1 of the photosensitive drum 1K and the circumferential speed difference X2 of the photosensitive drums 1Y, 1M, and 1C in the multicolor mode are both set to 0.15%. In addition, the circumferential speed difference X2 of the photosensitive drums 1Y, 1M, and 1C in the monocolor mode (thick paper) is set to 0%. Upon switching from the multicolor mode to the monocolor mode (monocolor thick paper mode), the circumferential speed of the photosensitive drums 1Y, 1M, and 1C becomes lower. Note that, when normal paper is fed in the monocolor mode, the photosensitive drums 1Y, 1M, and 1C stop. In this way, by Equation (1), the target speed of the rotation speed of the motor M5 which drives the photosensitive drum 1 is changed so that the torque of the motor M4 that drives the intermediate transfer belt 11 increases. In other words, the circumferential speed of the photosensitive drums 1Y, 1M, and 1C is changed to the predetermined speed.

Transfer Unit in which the Primary Transfer Roller 8 is Arranged Upstream of the Driving Roller 5

Figure 4:
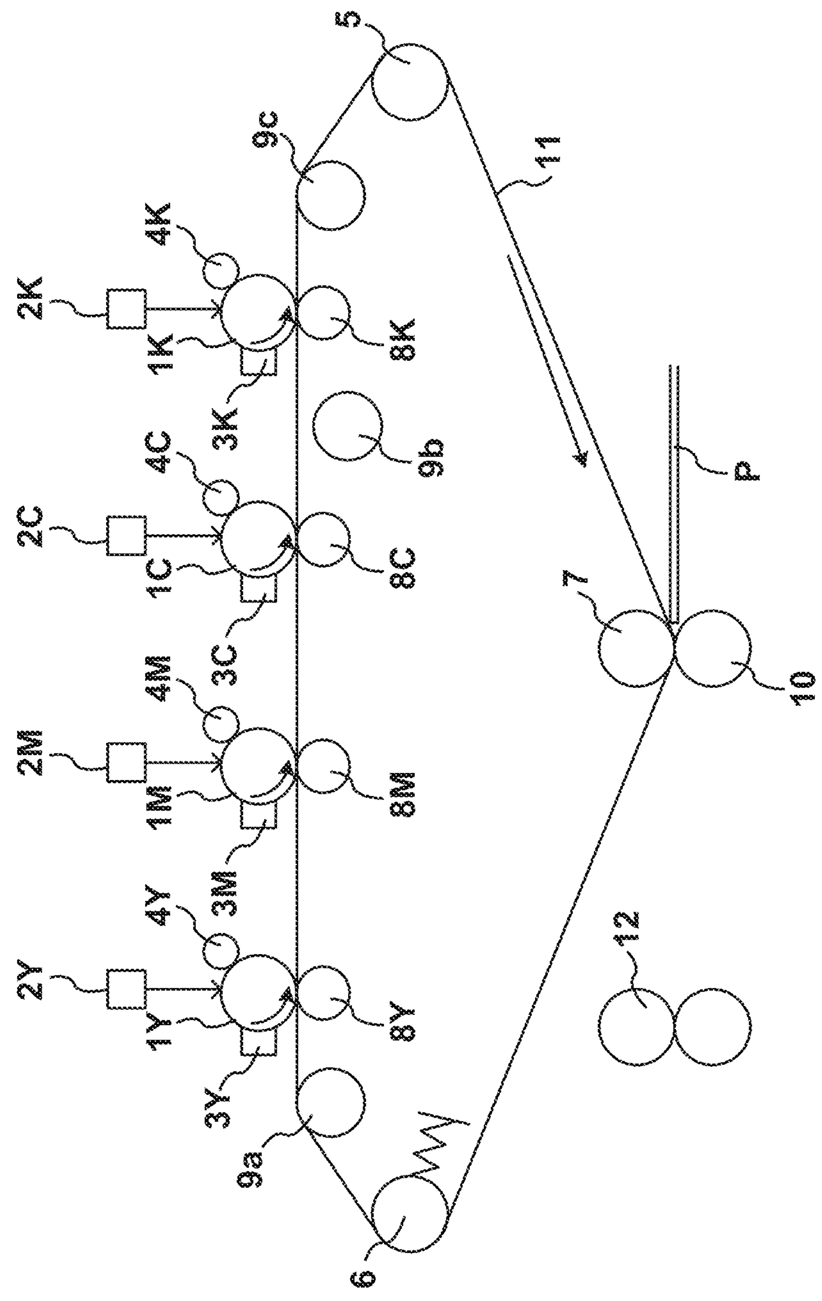
FIG. 4 is a view illustrating another system.

FIG. 4 illustrates a variation of the transfer unit (hereinafter referred to as the other system). The primary transfer roller 8 is arranged upstream of the driving roller 5. In addition, the tension roller 6 is arranged on an upstream side of the primary transfer roller 8.

In such a transfer unit, a circumferential speed difference X obtained by subtracting the circumferential speed of the intermediate transfer belt 11 from the circumferential speed of the photosensitive drum 1 is set to be a negative value. Specifically, the photosensitive drum 1 rotates slower than the intermediate transfer belt 11. There is a possibility that, if the circumferential speed difference X is set to a positive value, slack of the intermediate transfer belt 11 will occur in the primary transfer unit, and a transfer failure will occur.

Furthermore, the circumferential speed difference X between the photosensitive drums 1Y, 1M, and 1C and the intermediate transfer belt 11 is set so as to satisfy the relationship of the following equation.

$$X1 < X2 < 0\% \quad (2)$$

Accordingly, even if thick paper is fed in the monocolor mode, it is possible to suppress the occurrence of a shock image. Specifically, in a system where the photosensitive drum 1 is rotating slower than the intermediate transfer belt 11, the photosensitive drum 1 rotates while assisting the intermediate transfer belt 11. Therefore, the faster the speed of the photosensitive drum 1 (the closer the circumferential speed difference X is to 0%), the smaller the rotational torque of the intermediate transfer belt 11 becomes. Conversely, the slower the speed of the photosensitive drum 1 (the larger the circumferential speed difference X becomes on the negative side), the larger the rotational torque of the intermediate transfer belt 11 becomes. Accordingly, the speed variation of the intermediate transfer belt 11 when the sheet P has entered the secondary transfer unit becomes small. In the present embodiment, the circumferential speed difference X1 of the photosensitive drum 1K and the circumferential speed difference X2 of the photosensitive drums 1Y, 1M, and 1C in the multicolor mode are both set to 0.15%. In addition, the circumferential speed difference X2 of the photosensitive drums 1Y, 1M, and 1C in the monocolor mode (thick paper) is set to −0.3%. In other words, upon switching from the multicolor mode to the monocolor mode (monocolor thick paper mode), the circumferential speed of the photosensitive drums 1Y, 1M, and 1C is lowered. In this way, by Equation (2), the target speed of the rotation speed of the motor M5 which drives the photosensitive drum 1 is changed so that the torque of the motor M4 that drives the intermediate transfer belt 11 increases. In other words, the circumferential speed of the photosensitive drums 1Y, 1M, and 1C is changed to the predetermined speed.

[Flowchart]

Figure 5:
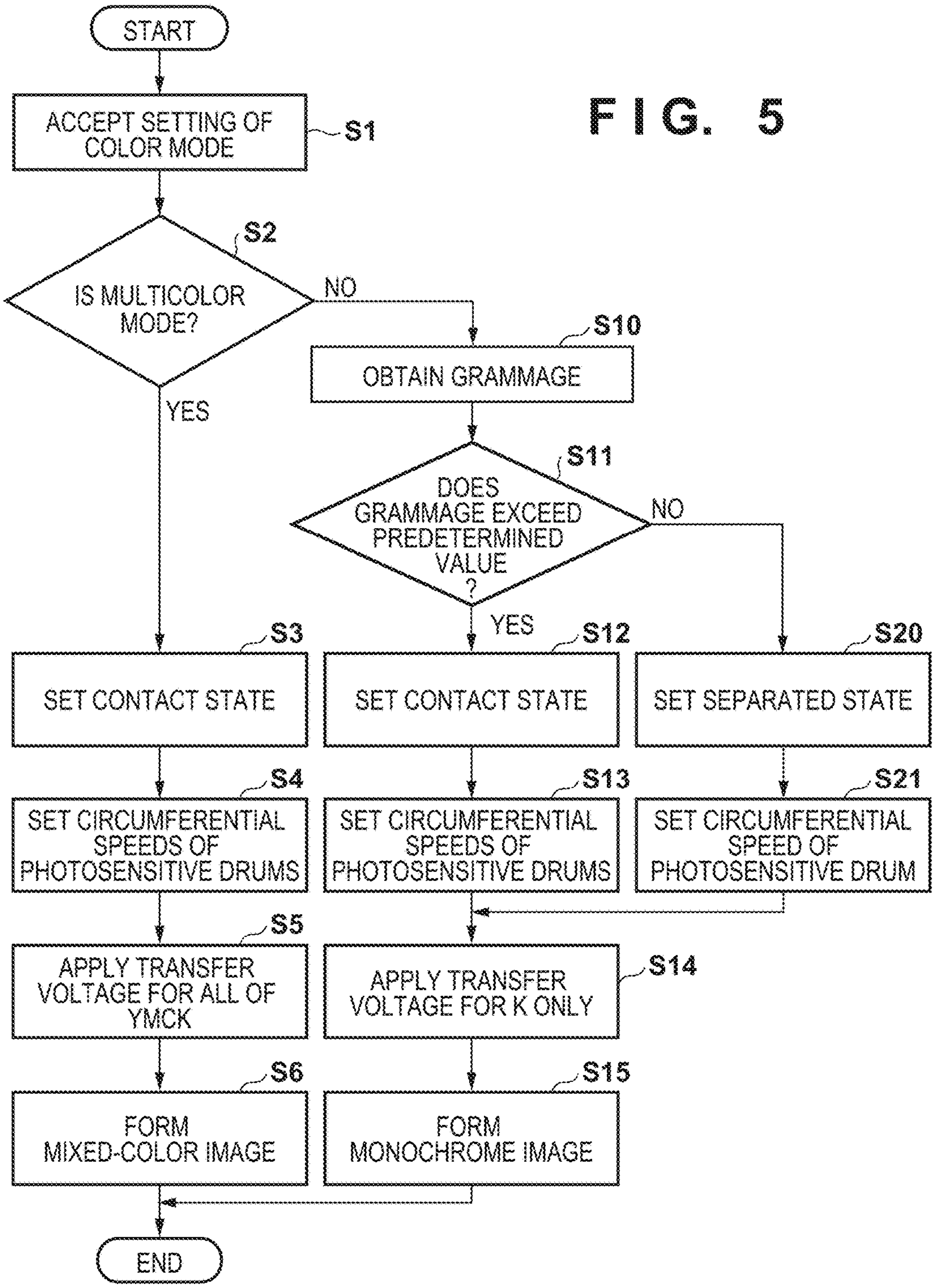
FIG. 5 is a flowchart for illustrating processing executed by a CPU.

FIG. 5 is a flowchart that illustrates processing that the CPU 30 executes. In step S1, the CPU 30 (the mode setting unit 301) accepts a setting (a designation) for the color mode that is inputted from the operation unit 33 or a host computer. In step S2, the CPU 30 (the mode determination unit 302) determines whether the set color mode is the multicolor mode or the monocolor mode. When the multicolor mode is set, the CPU 30 advances the processing to step S3.

In step S3, the CPU 30 (the contact control unit 305) sets the state of the intermediate transfer belt 11 (the photosensitive drums 1Y, 1M, and 1C) to the state of contact. In other words, the CPU 30 controls the motor M1 to raise the auxiliary roller 9*a*, controls the motor M2 to lower the auxiliary roller 9*b*, and controls the motor M3 to raise the primary transfer rollers 8Y, 8M, and 8C. Accordingly, the primary transfer rollers 8Y, 8M, and 8C come into contact with the inner circumferential surface of the intermediate transfer belt 11 and further rise to cause the outer circumferential surface of the intermediate transfer belt 11 to contact with the photosensitive drums 1Y, 1M, and 1C. In step S4 the CPU 30 (the circumferential speed setting unit 306) sets the respective circumferential speeds of the photosensitive drums 1Y, 1M, 1C, and 1K to all be the same speed. However, this speed is set so that the circumferential speed difference with respect to the circumferential speed of the intermediate transfer belt 11 becomes 0.15% (−0.15% in the other system). In step S5, the CPU 30 (the transfer control unit 307) applies the transfer voltage for all of YMCK. In other words, the transfer power supply 32 applies the transfer voltage to each of the primary transfer rollers 8Y, 8M, 8C, and 8K in accordance with an instruction by the CPU 30. In step S6, the CPU 30 (the image forming control unit 308) controls the exposure units 2Y, 2M, 2C, and 2K in accordance with image information inputted from an image scanner or a host computer to form a mixed-color image.

Meanwhile, when it is determined in step S2 that the monocolor mode is set, the CPU 30 advances the processing to step S10. In step S10, the CPU 30 (the grammage obtainment unit 303) obtains the grammage of the sheet P in accordance with information inputted from the operation unit 33, a host computer, or the grammage sensor 14. Instead of the grammage, paper type information that indicates normal paper, thick paper, or the like, or brand information of the sheet P (a manufacturer name, a product name, or the like) may be inputted. This is because it is possible to identify the grammage from this information. In step S11, the CPU 30 (the grammage determination unit 304) determines whether the grammage exceeds a predetermined value. Note that configuration may be taken to employ processing for determining whether there is normal paper or thick paper based on information inputted from the operation unit 33 or the like, without using a grammage. If the grammage exceeds the predetermined value, the CPU 30 advances the processing to step S12. In step S12, the CPU 30 (the contact control unit 305) sets the state of the intermediate transfer belt 11 (the photosensitive drums 1Y, 1M, and 1C) to the state of contact. In step S13, the CPU 30 (the circumferential speed setting unit 306) sets the respective circumferential speeds of the photosensitive drums 1Y, 1M, 1C, and 1K. Here, the circumferential speed of the photosensitive drum 1K is set to a circumferential speed for promoting transfer of a toner image. Although the photosensitive drums 1Y, 1M, and 1C do not form toner images, respective circumferential speeds of the photosensitive drums 1Y, 1M, and 1C are set to a predetermined circumferential speed so as to reduce a variation of load of the intermediate transfer belt 11. The circumferential speed of the photosensitive drum 1K is set so that the circumferential speed difference becomes 0.15% (−0.15% in the other system), for example. The respective circumferential speeds of the photosensitive drums 1Y, 1M, and 1C are set so that a circumferential speed difference becomes 0% (−0.3% in the other system), for example. In this way, the circumferential speed setting unit 306 changes a target rotation speed of the second photosensitive member. In particular, if a monochrome image of a first color is formed on a predetermined sheet in the second mode, the circumferential speed setting unit 306 changes the target rotation speed of the photosensitive drums 1Y, 1M, and 1C (the second photosensitive member) to a predetermined rotation speed so that torque of a third motor that drives the intermediate transfer belt 11 increases. The driving circuit 31 performs feedback control of the third motor so that a circumferential speed of the intermediate transfer belt 11 which is rotated by the third motor becomes another target circumferential speed. As explained in relation to Equation (1), the other target speed of the intermediate transfer belt 11 may be set slower than the target speed of the photosensitive drums 1Y, 1M, and 1C (the second photosensitive member). In accordance with Equation (1), the circumferential speed difference between the photosensitive drums 1Y, 1M, and 1C (the second photosensitive member) and the intermediate transfer belt 11 in the monocolor mode is set smaller than the circumferential speed difference between the photosensitive drums 1Y, 1M, and 1C (the second photosensitive member) and the intermediate transfer belt 11 in the multicolor mode. Meanwhile, as explained in relation to Equation (2), in the other system, the other target circumferential speed of the intermediate transfer belt 11 is faster than the circumferential speed of the second photosensitive member. In accordance with Equation (2), the circumferential speed difference between the photosensitive drums 1Y, 1M, and 1C (the second photosensitive member) and the intermediate transfer belt 11 in the monocolor mode is set smaller than the circumferential speed difference between the photosensitive drums 1Y, 1M, and 1C (the second photosensitive member) and the intermediate transfer belt 11 in the multicolor mode. In step S14, the CPU 30 (the transfer control unit 307) does not apply the transfer voltage for YMC, and applies the transfer voltage for K only. In other words, the transfer power supply 32 applies the transfer voltage to the primary transfer roller 8K and does not apply the transfer voltage to the primary transfer rollers 8Y, 8M, and 8C, in accordance with an instruction by the CPU 30. In step S15, the CPU 30 (the image forming control unit 308) controls the exposure unit 2K in accordance with image information inputted from an image scanner or a host computer to form a monochrome image.

In step S11, when it is determined that the grammage is less than or equal to the predetermined value, the CPU 30 advances the processing to step S20. In step S20 the CPU 30 (the contact control unit 305) sets the state of the intermediate transfer belt 11 (the photosensitive drums 1Y, 1M, and 1C) to the separated state. In other words, the CPU 30 controls the motor M1 to lower the auxiliary roller 9*a*, controls the motor M2 to raise the auxiliary roller 9*b*, and controls the motor M3 to lower the primary transfer rollers 8Y, 8M, and 8C. Accordingly, the primary transfer rollers 8Y, 8M, and 8C separate from the inner circumferential surface of the intermediate transfer belt 11. By this, the outer circumferential surface of the intermediate transfer belt 11 also separates from the photosensitive drums 1Y, 1M, and 1C. In step S21 the CPU 30 (the circumferential speed setting unit 306) sets the circumferential speed of the photosensitive drum 1K. However, this circumferential speed is set so that the circumferential speed difference with respect to the circumferential speed of the intermediate transfer belt 11 becomes 0.15% (−0.15% in the other system). The circumferential speed of the photosensitive drums 1Y, 1M, and 1C is set to 0, and the photosensitive drums 1Y, 1M, and 1C do not rotate. Subsequently, the CPU 30 executes step S14 and step S15, and forms a monochrome image to the sheet P.

[Summary]

An electrophotographic image forming apparatus forms an electrostatic latent image on a photosensitive member, and forms an image by using a developing agent to develop this electrostatic latent image. The image formed on the photosensitive member is first transferred to an intermediate transfer member, and then transferred from the intermediate transfer member to a sheet.

There is a need for the image forming apparatus to control a circumferential speed at which the surface of the photosensitive member moves (a surface speed) and a circumferential speed at which the surface of the intermediate transfer member moves (a surface speed) to constant speeds. This is because a laser beam for forming the electrostatic latent image on the photosensitive member scans the photosensitive member at a timing decided in advance. For example, when the surface speed of the photosensitive member changes, the pitch of a scan line changes, and the length of an image may change, or a density non-uniformity in the image on the photosensitive member may occur. In addition, to form a full color image, in an image forming apparatus that superimposes and transfers images for each color formed by a plurality of image forming units onto the intermediate transfer member, misalignment of the relative positions of the images of each color occurs, and the tint changes. Accordingly, to control the surface speed of the intermediate transfer member and the surface speed of the photosensitive member, the image forming apparatus executes feedback control based on output of an encoder, for example.

Here, explanation is given regarding target speeds for the surface speed of the photosensitive member and the surface speed of the intermediate transfer member. It is desirable to control the circumferential speed of the photosensitive member and the circumferential speed of the intermediate transfer member to different speeds. This is because it is possible to suppress transfer failure from occurring in an image to be transferred from the photosensitive member to the intermediate transfer member, in a case of forming an image such as text or thin lines. It is known that, if the circumferential speed of the photosensitive member is faster than the circumferential speed of the intermediate transfer member, a force where the photosensitive member presses the intermediate transfer member increases and pressure for a nip portion between the photosensitive member and the intermediate transfer member increases to suppress transfer failure. Therefore, a target speed for the circumferential speed of the photosensitive member and a target speed for the circumferential speed of the intermediate transfer member are set so that the circumferential speed of the photosensitive member is faster than the circumferential speed of the intermediate transfer member.

However, in an image forming apparatus where the circumferential speed of the photosensitive member and the circumferential speed of the intermediate transfer member are controlled to different speeds, a friction coefficient of the photosensitive member or the intermediate transfer member can change in accordance with a number of print sheets or an internal temperature of the image forming apparatus. While an image is being formed, because a developing agent is supplied to the nip portion for transferring the image on the photosensitive member to the intermediate transfer member, the surface speed of the intermediate transfer member or the photosensitive member is controlled to a target speed even if the friction coefficient of the intermediate transfer member or the photosensitive member changes. However, at a timing when there is a change from a state in which the developing agent is not interposed in the nip portion to a state in which the developing agent is interposed in the nip portion, there is the possibility that a load of a motor for driving the photosensitive member or the intermediate transfer member will suddenly change, or that the rotation speed of the motor will become uncontrollable. This timing occurs, for example, immediately after starting driving to rotate the photosensitive member or the intermediate transfer member to form an image. In a state where the rotation speed of the motor cannot be controlled, an image defect as previously described occurs.

Accordingly, an image forming apparatus that adjusts a difference between the circumferential speed of the photosensitive member and the circumferential speed of the intermediate transfer member so that a difference between a load of a motor in a state where a developing agent is supplied to a nip portion and a load of the motor in a state where the developing agent is not supplied to the nip portion decreases is known (US 2015/0362867). This image forming apparatus obtains a drive signal for the motor while supplying the developing agent to the nip portion and switching a speed command value of the motor, and obtains a drive signal for the motor while switching the speed command value of the motor without supplying the developing agent to the nip portion. The image forming apparatus recited in US 2015/0362867 then determines, based on the drive signals of the motor, a speed command value for the motor for which the difference between the load of the motor in the state where the developing agent is supplied to the nip portion and the load of the motor in the state where the developing agent is not supplied to the nip portion is smallest.

However, even if the difference of the circumferential speeds is controlled so that a difference between a load of a motor in a state where a developing agent is supplied to a nip portion and a load of the motor in a state where the developing agent is not supplied to the nip portion decreases, there is still a possibility that speed variation of the intermediate transfer member will occur. This is a reason for a frictional force between the photosensitive member and the intermediate transfer member increasing, and the surface speed of the intermediate transfer member changing due to the rotation speed of the photosensitive member. If the surface speed of the intermediate transfer member cannot be controlled to a target speed, for example, the length of an image may change, or a non-uniformity of a density of an image on the intermediate transfer member may occur.

In particular, in a case of forming a monochrome image in a state where a plurality of photosensitive members are caused to be in contact with an intermediate transfer member, while forming the monochrome image, a developing agent is not supplied to a nip portion between the intermediate transfer member and a photosensitive member that is not the photosensitive member on which the monochrome image is formed. Therefore, in a case of forming a monochrome image in a state where a plurality of photosensitive members are caused to be in contact with the intermediate transfer member, the surface speed of the intermediate transfer member could not be controlled to a target speed.

Accordingly, the present embodiment suppresses the rotation speed of the intermediate transfer member in the monocolor mode from becoming uncontrollable.

Image Forming Apparatus

Figure 6:
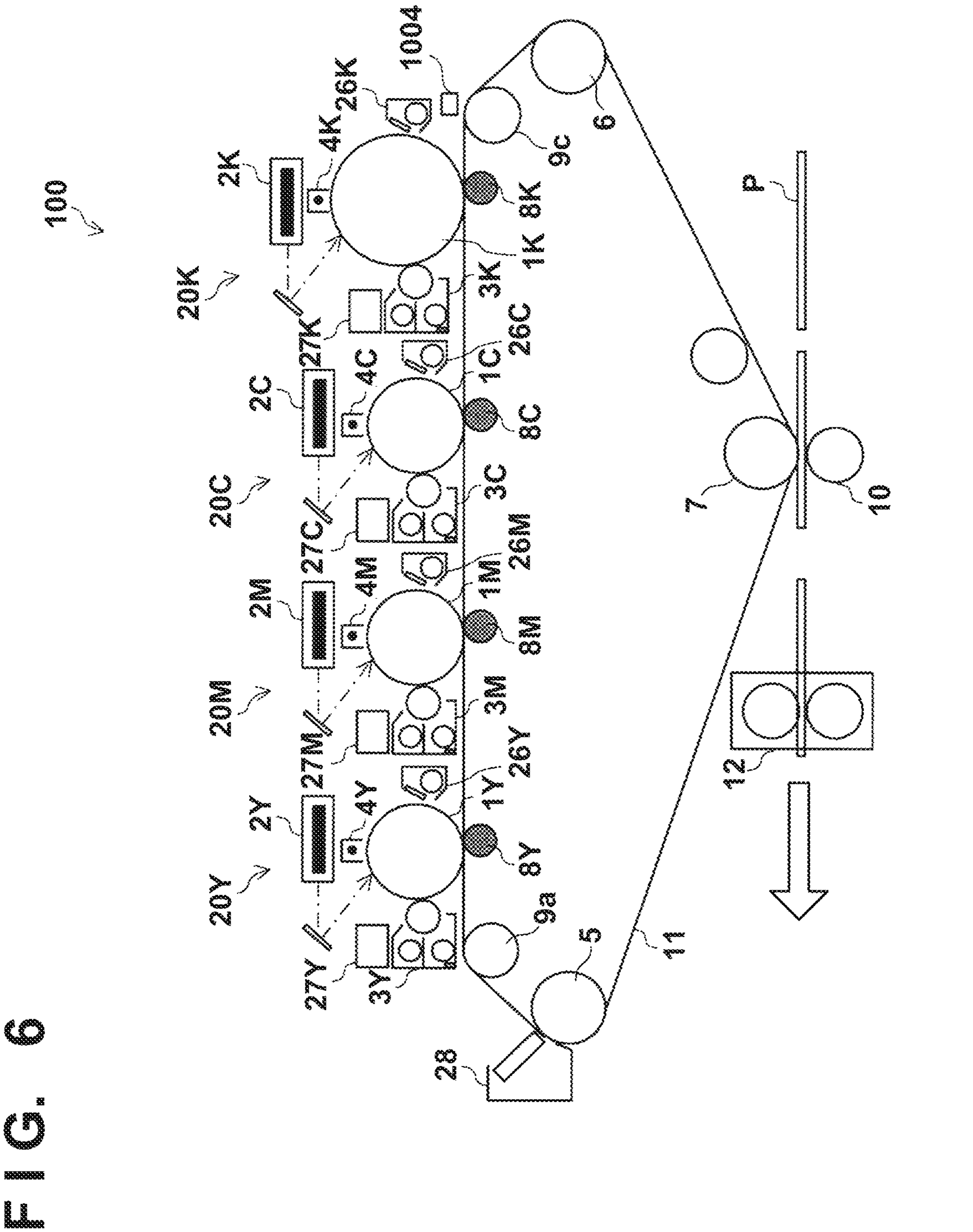
FIG. 6 is a configuration diagram of an image forming apparatus.

FIG. 6 is a configuration diagram of another image forming apparatus. The same reference numerals are applied to members that are already explained. The image forming units 20 of each color have a similar configuration, and are provided with the photosensitive drum 1, the charger 4, the exposure unit 2, the developer 3, and a drum cleaner 26. Note that, because the photosensitive drum 1K of an image forming unit 20K that forms a black image is used at times of forming monochrome images in addition to full color images, in consideration of a product lifespan, the photosensitive drum 1K may be formed such that the drum diameter is larger than that of the other color photosensitive drums 1Y, 1M, and 1C.

The developer 3 may accommodate a developing agent having two components including a non-magnetic toner and low-magnetization high-resistance carrier. The non-magnetic toner is configured by using appropriate amounts of a binder resin such as a styrene resin or a polyester resin, a colorant such as carbon black, a dye, or a pigment, a release agent such as wax, and a charge-controlling agent. The toner can be manufactured by a conventional method such as a pulverization method or a polymerization method. The toner is subject to frictional electrification with the low-magnetization high-resistance carrier in the developer 3. The charged toner is attached to the electrostatic latent image on the photosensitive drum 1 by a developing potential being applied. By this, the electrostatic latent image is developed. In the present embodiment, the toner is negatively charged. For the developer 3, toner is supplied from a toner replenishment basin 27.

A toner image formed on the photosensitive drum 1 is transferred to the intermediate transfer belt 11 by the primary transfer roller 8. An image sensor 1004 for detecting the toner image (image) formed on the intermediate transfer belt 11 is arranged near the intermediate transfer belt 11. The photosensitive drum 1 and the intermediate transfer belt 11 form a nip portion for transfer of the toner image. Toner that remains on the photosensitive drum 1 after the transfer is removed by the drum cleaner 26. Toner that remains on the intermediate transfer belt 11 after the transfer is removed by a transfer member cleaner 28.

Development Processing

Figure 7:
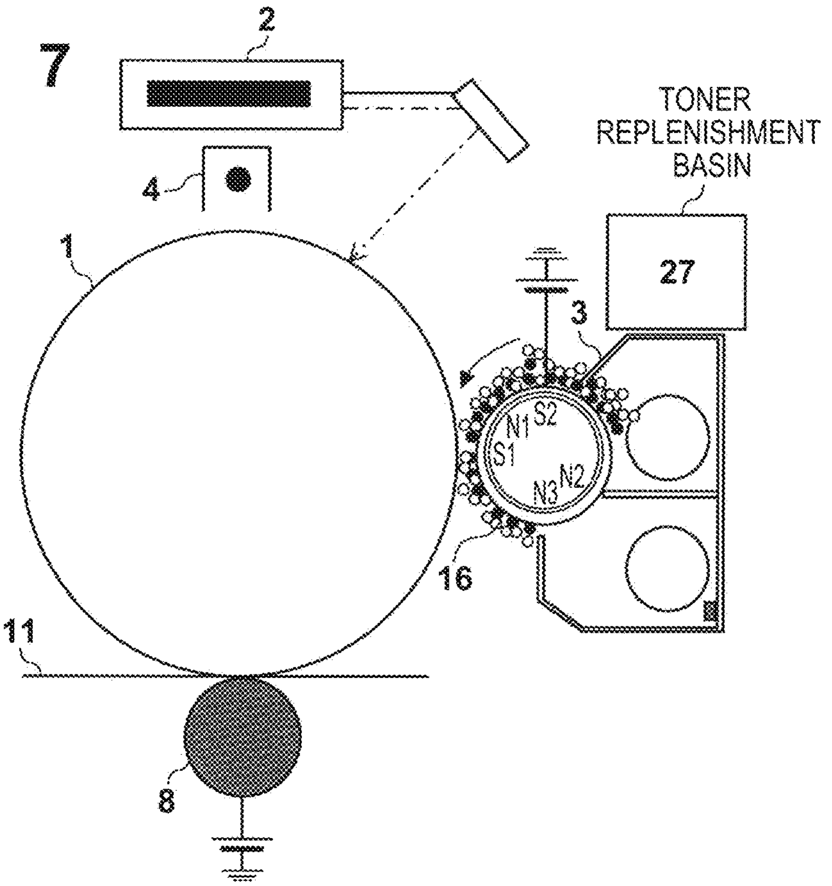
FIG. 7 is an explanatory view of development processing.
Figure 8:
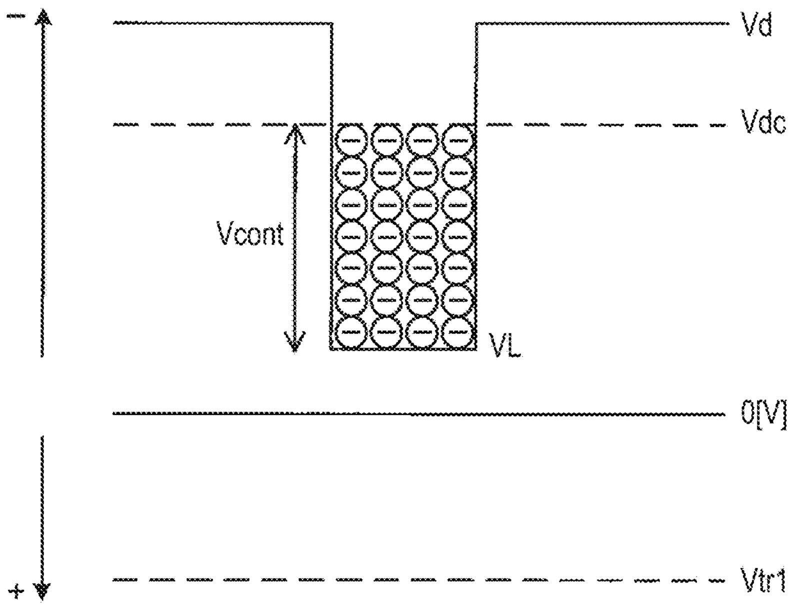
FIG. 8 is an explanatory view of development processing.

FIG. 7 and FIG. 8 are views for explaining development processing by the developer 3. The surface of the photosensitive drum 1 is charged by the charger 4, and a surface potential becomes a negative potential Vd. A potential (an exposed portion potential) VL of a portion of the photosensitive drum 1 on which the electrostatic latent image is formed is subject to the removal of electric charge from the potential Vd toward 0 [V]. The potential Vd is −700 [V], for example. The exposure unit potential VL is −200 [V], for example.

The developer 3 conveys, in accordance with a developing agent carrier (developing sleeve) 16, the developing agent that includes the negatively charged toner that is accommodated to a vicinity of the photosensitive drum 1. A developing potential Vdc applied to the developing agent carrier 16 at a time of developing is a potential between the potential Vd and the exposure unit potential VL, and is −550 [V] for example. Toner that is negatively charged on the developing agent carrier 16 flies, in accordance with the negative developing potential Vdc, to the portion having the exposure unit potential VL that is relatively closer to a positive electric potential than the developing potential Vdc or the potential Vd of the surface of the photosensitive drum 1. Accordingly, toner of an amount in accordance with a developing latent image potential Vcont that is a difference between the developing potential Vdc and the exposure unit potential VL attaches to the photosensitive drum 1. The density of a toner image is decided in accordance with the amount of toner that attaches to the photosensitive drum 1. As a consequence, the image density is adjusted by adjusting the developing latent image potential Vcont. Toner having a negative polarity that has flown to the photosensitive drum 1 is transferred to the intermediate transfer belt 11 in accordance with an electric field and pressure between the primary transfer roller 8 and the intermediate transfer belt 11. At this time, a primary transfer bias potential Vtr1 having an opposite polarity to that of the toner is applied to the primary transfer roller 8. The primary transfer bias potential Vtr1 is +1500 [V], for example.

Control System

Figure 9:
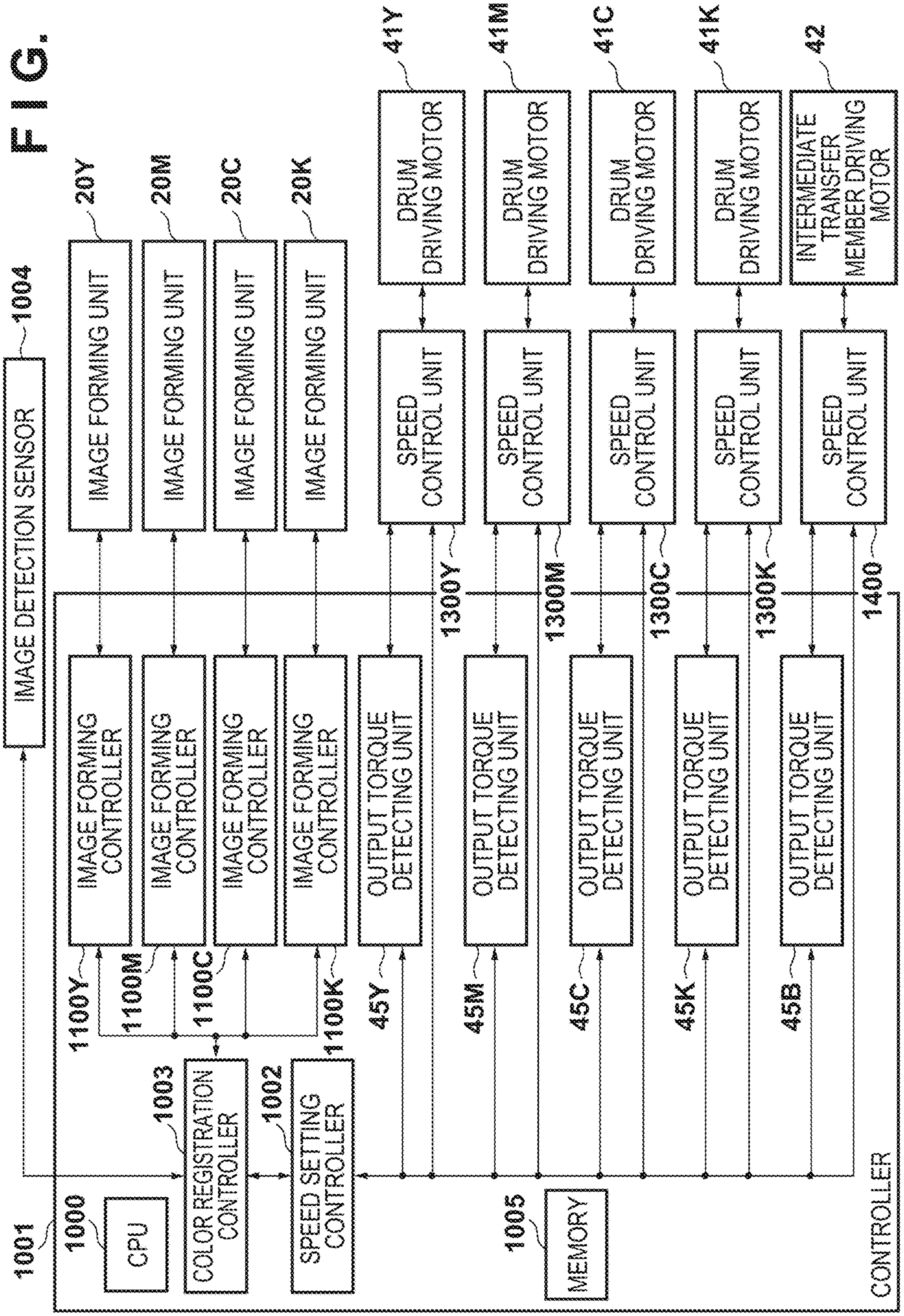
FIG. 9 is a configuration diagram of a control system.

FIG. 9 is a configuration diagram of another control system of the image forming apparatus 100 having such a configuration. The control system is integrated in the image forming apparatus 100. The image forming apparatus 100 performs an image forming process in which operation of each unit is controlled by the control system. The control system controls operation of the image forming apparatus 100, by mainly a controller 1001. The controller 1001 is provided with a CPU (Central Processing Unit) 1000 as a main control unit. The CPU 1000 controls operation of each unit by reading out a computer program from a memory 1005 and executing it. The memory 1005 is a storage apparatus that comprises a ROM, a RAM, or the like. The controller 1001 is provided with a speed setting controller 1002, a color registration controller 1003, image forming controllers 1100Y, 1100M, 1100C, and 1100K, and output torque detecting units 45Y, 45M, 45C, 45K, and 45B. The controller 1001 is connected to the image sensor 1004, the image forming units 20Y through 20K, and speed control units 1300Y through 1300K and 1400. The speed control units 1300Y through 1300K are connected to motors 41Y through 41K. The speed control unit 1400 is connected to a motor 42.

The color registration controller 1003 controls operation of the image sensor 1004 in accordance with control by the CPU 1000, and performs adjustment of the image forming controllers 1100Y through 1100K in accordance with a detection result by the image sensor 1004. In other words, the color registration controller 1003 corrects relative positions of images of different colors. The speed setting controller 1002 sets a target rotation speed of the intermediate transfer belt 11 and each of the photosensitive drums 1Y through 1K in accordance with control by the CPU 1000.

The image forming controller 1100Y controls operation of the image forming unit 20Y in accordance with control by the CPU 1000. The image forming controller 1100M controls operation of the image forming unit 20M in accordance with control by the CPU 1000. The image forming controller 1100C controls operation of the image forming unit 20C in accordance with control by the CPU 1000. The image forming controller 1100K controls operation of the image forming unit 20K in accordance with control by the CPU 1000.

The speed control unit 1300Y is a drive control unit that controls operation of the motor 41Y based on the target rotation speed set by the speed setting controller 1002. The motor 41Y rotationally drives the photosensitive drum 1Y. The speed control unit 1300Y controls a current value that flows to the motor 41Y so that the circumferential speed of the photosensitive drum 1Y becomes a target speed Vref2*y*. The current value is a PWM (Pulse Width Modulation) signal. The output torque detecting unit 45Y detects a current value supplied to the motor 41Y. The current value that flows to the motor 41Y represents a load torque of the motor 41Y. In this way, the PWM signal is a signal value that is in accordance with a torque of the motor. In other words, the PWM signal represents a signal value that is in accordance with the torque. The output torque detecting unit 45Y transmits the PWM signal to the speed setting controller 1002. The speed control unit 1300Y controls the load torque of the motor 41Y so that the photosensitive drum 1Y rotates at a predetermined speed (a target speed). Such a target speed is set based on a duty ratio of the PWM signal in accordance with the torque at the least. Note that the target speed may be set with consideration given to the drum diameter of the photosensitive drum 1.

The speed control unit 1300M is a drive control unit that controls operation of the motor 41M based on the target rotation speed set by the speed setting controller 1002. The motor 41M rotationally drives the photosensitive drum 1M. The speed control unit 1300M controls a current value that flows to the motor 41M so that the circumferential speed of the photosensitive drum 1M becomes a target speed Vref2*m*. The output torque detecting unit 45M detects the PWM signal (a current value) supplied to the motor 41M. The current value that flows to the motor 41M represents a load torque of the motor 41M. The output torque detecting unit 45M transmits the PWM signal to the speed setting controller 1002. The speed control unit 1300M controls the load torque of the motor 41M so that the photosensitive drum 1M rotates at a predetermined speed (a target speed).

The speed control unit 1300C is a drive control unit that controls operation of the motor 41C based on the target rotation speed set by the speed setting controller 1002. The motor 41C rotationally drives the photosensitive drum 1C. The speed control unit 1300C controls a current value that flows to the motor 41C so that the circumferential speed of the photosensitive drum 1C becomes a target speed Vref2*c*. The output torque detecting unit 45C detects the PWM signal (a current value) supplied to the motor 41C. The current value that flows to the motor 41C represents a load torque of the motor 41C. The output torque detecting unit 45C transmits the PWM signal to the speed setting controller 1002. The speed control unit 1300C controls the load torque of the motor 41C so that the photosensitive drum 1C rotates at a predetermined speed (a target speed).

The speed control unit 1300K is a drive control unit that controls operation of the motor 41K based on the target rotation speed set by the speed setting controller 1002. The motor 41K rotationally drives the photosensitive drum 1K. The speed control unit 1300K controls a current value that flows to the motor 41K so that the circumferential speed of the photosensitive drum 1K becomes a target speed Vref2*k*. The output torque detecting unit 45K detects the PWM signal (a current value) supplied to the motor 41K. The current value that flows to the motor 41K represents a load torque of the motor 41K. The output torque detecting unit 45K transmits the PWM signal to the speed setting controller 1002. The speed control unit 1300K controls the load torque of the motor 41K so that the photosensitive drum 1K rotates at a predetermined speed (a target speed).

The speed control unit 1400 is a drive control unit that controls operation of the motor 42 based on the target rotation speed set by the speed setting controller 1002. The intermediate transfer belt 11 is driven rotationally by the motor 42. The speed control unit 1400 controls a current value that flows to the motor 42 so that the circumferential speed of the intermediate transfer belt 11 becomes a target speed Vrefb. The output torque detecting unit 45B detects the PWM signal (a current value) supplied to the motor 42. The current value that flows to the motor 42 represents the load torque of the motor 42. The output torque detecting unit 45B transmits the PWM signal to the speed setting controller 1002. The speed control unit 1400 controls the load torque of the motor 42 so that the intermediate transfer belt 11 rotates at a predetermined speed (a target speed).

Image Forming Process

In a case of consecutively performing image forming processes to two of the sheet P, the image forming apparatus 100 performs pre-rotational processing, image processing, sheet-to-sheet processing, and post rotational processing.

The pre-rotational processing is processing to make driving units of the motors 41Y through 41K, the motor 42, or the like, and high-voltage members such as the charger 4 be in a stable operation state before image forming is executed. In the pre-rotational processing, the photosensitive drum 1 and the intermediate transfer belt 11 are driven. The photosensitive drum 1 and the intermediate transfer belt 11 are rotated by DC motors. Therefore, a predetermined period, for example 500 milliseconds, is required for the rotation speed of these rotating members to reach and stabilize at target rotation speeds (target speeds), from the start of driving. Explanation is given later regarding details of the driving of the photosensitive drum 1 and the intermediate transfer belt 11. After the rotation speeds of the photosensitive drum 1 and the intermediate transfer belt 11 have stabilized at fixed speeds, a charging bias is applied to the charger 4. The primary transfer bias potential Vtr1 is applied in accordance with a timing at which a charged portion on the photosensitive drum 1 passes the position of the primary transfer roller 8. Configuration may be taken such that, before the electrostatic latent image formed on the photosensitive drum 1 approaches the developing agent carrier 16, the rotation speed of the driving unit for the developing agent carrier 16 becomes a desired rotation speed, and the developing potential Vdc has achieved a desired potential. However, degradation of the developing agent is prevented when the developing potential Vdc becomes the desired potential and the rotation speed of the driving unit for the developing agent carrier 16 becomes the desired rotation speed at as late a timing as possible.

The image processing is processing for forming a toner image on the photosensitive drum 1, and transferring it to the intermediate transfer belt 11. In the image processing, an electrostatic latent image is formed by a laser beam from the exposure unit 2 being exposed with respect to a surface of the charged photosensitive drum 1. The developer 3 visualizes the electrostatic latent image by the toner. The primary transfer roller 8 transfers the toner image formed on the photosensitive drum 1 to the intermediate transfer belt 11.

The sheet-to-sheet processing is processing for operating each driving unit and high-voltage member without performing image processing in a small gap between the first and second sheets.

The post rotational processing represents processing for stopping each driving unit and high-voltage member. In the post rotational processing, after the driving units for the exposure unit 2, the charger 4, the developing agent carrier 16, and the developing potential Vdc, the primary transfer bias potential Vtr1, and the charging bias are stopped in this order, rotation of the photosensitive drum 1 and the intermediate transfer belt 11 is stopped.

Color Registration

The image forming apparatus 100 detects, by the image sensor 1004, a position of a test image formed on the intermediate transfer belt 11. The image detection sensor 1004 functions as a detection unit for detecting the test image. The image forming apparatus 100 corrects a position for forming the toner image on the photosensitive drum 1. Processing in which the image forming apparatus 100 forms a test image until it corrects the position for forming the toner image is referred to below as color registration. Color registration is performed when instructed by a user, at a time of setting the image forming apparatus 100, after image formation to a predetermined number of sheets, or at a predetermined set timing. By color registration, a temporal change of a position for forming a toner image due to environment changes such as a rise in temperature inside the apparatus and misalignment of the position for forming a toner image due to manufacturing variation of the image forming apparatus 100 is corrected.

When an instruction to start color registration is made, the controller 1001 starts driving of the intermediate transfer belt 11, and starts image processing for a test image.

Figure 10:
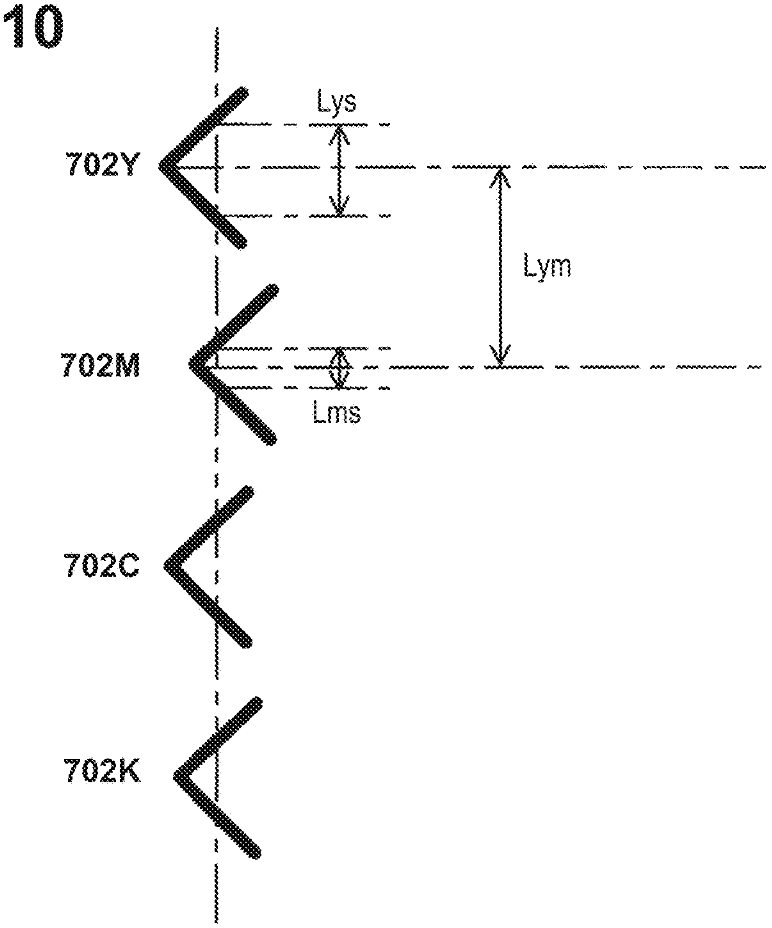
FIG. 10 is a view for exemplifying a test image.

FIG. 10 is a view that exemplifies a test image. Test images 702Y, 702M, 702C, and 702K for respective colors are consecutively formed on the intermediate transfer belt 11, arranged in the rotation direction of the intermediate transfer belt 11. The image sensor 1004 consecutively detects, in accordance with rotation of the intermediate transfer belt 11, the test images 702Y, 702M, 702C, and 702K that pass a detection position.

The color registration controller 1003 detects relative positions of each of the test images 702Y, 702M, 702C, and 702K based on timings that the image sensor 1004 detects the test images 702Y, 702M, 702C, and 702K. A spacing for each of the test images 702Y, 702M, 702C, and 702K is calculated from the timing at which the test images 702Y, 702M, 702C, and 702K for each color pass the detection position of the image sensor 1004 (the alternate long and two short dashed line in FIG. 10). For example, spacings Lys and Lms of FIG. 10 change in accordance with misalignment of a position in the main scanning direction (a direction orthogonal to the rotation direction of the intermediate transfer belt 11) of the test images 702Y and 702M, respectively. A relative positional relationship in the main scanning direction for the test images 702Y and 702M is calculated based on the spacings Lys and Lms.

In addition, a spacing Lym is a relative difference of average values of two passage portions of the test images 702Y and 702M, respectively. From Lym, the relative positional relationship in a sub scanning direction (the rotation direction of the intermediate transfer belt 11) for the test images 702Y and 702M is calculated based on the spacing Lym. In this way, relative positional relationships for the test images 702Y, 702M, 702C, and 702K of each color are calculated.

Taking the test images 702Y, 702M, 702C, and 702K of each color as one set as in FIG. 10, a plurality of sets of the test images 702Y, 702M, 702C, and 702K are formed, and the positional relationships therebetween are calculated. Various disturbances occur for the test images of each set, and small variation of the image formation position occurs. By averaging the positional relationships calculated in accordance with the plurality of sets of test images, it is possible to accurately detect the positional relationship for the test images 702Y, 702M, 702C, and 702K.

The color registration controller 1003 repeatedly performs such a series of processing until the positional relationship is obtained from a predetermined number of sets of test images. After the positional relationship is obtained from a predetermined number of sets of test images, the color registration controller 1003 averages relative position misalignment for each of the test images 702Y, 702M, 702C, and 702K, and calculates adjustment values such that the average position misalignment is corrected. The color registration controller 1003 adjusts the exposure timing of the laser beam by the exposure unit 2 based on the calculated adjustment values. Thereby, the relative position of images formed by the image forming units 20Y, 20M, 20C, and 20K are corrected to an ideal position.

Rotation Speed Control of the Photosensitive Drum 1 and the Intermediate Transfer Belt 11

Figure 11:
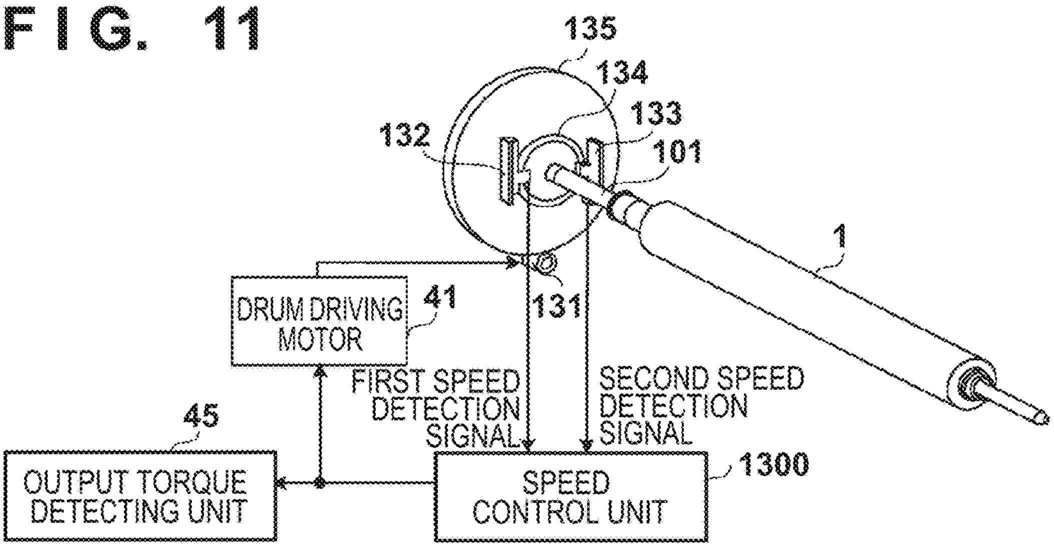
FIG. 11 is an explanatory view of a drum driving unit.

FIG. 11 is a view for explaining a drum driving unit for driving the photosensitive drum 1 rotationally. The drum driving unit is provided with a motor gear 131, a first speed detecting unit 132, a second speed detecting unit 133, an encoder 134, and a drum driving gear 135, and is driven by the motor 41. For the motor 41, the rotation speed is controlled by the speed control unit 1300.

By the driving by the motor 41, a driving force is transferred to a drum axis 101 of the photosensitive drum 1 via the motor gear 131 and the drum driving gear 135. Accordingly, the photosensitive drum 1 rotates. The encoder 134 is arranged on the drum axis 101. The first speed detecting unit 132 and the second speed detecting unit 133 monitor rotation of the encoder 134. The first speed detecting unit 132 and the second speed detecting unit 133 detect the rotation speed of the photosensitive drum 1 at different timings while the photosensitive drum 1 is performing one rotation. The first speed detecting unit 132 inputs a first speed detection signal indicating the rotation speed of the photosensitive drum 1 to the speed control unit 1300. The second speed detecting unit 133 inputs a second speed detection signal indicating the rotation speed of the photosensitive drum 1 to the speed control unit 1300. The speed control unit 1300 generates a current value (a PWM signal) in accordance with the first and second speed detection signals and the target rotation speed, and inputs it to the motor 41. In other words, the speed control unit 1300 executes feedback control such that the rotation speed of the photosensitive drum 1 becomes constant at the target speed. Note that the rotation speed of the photosensitive drum 1 is controlled to a range of ±0.003% with respect to the target speed.

The speed control unit 1300 also inputs a PWM signal to the output torque detecting unit 45. The PWM signal represents necessary power for driving the photosensitive drum 1, and is a signal that is associated with the load torque of the motor 41. The load torque of the motor 41 represents the load torque of the photosensitive drum 1. In addition, the circumferential speed of the photosensitive drum 1 is faster than the circumferential speed of the intermediate transfer belt 11. For example, the target rotation speed of the photosensitive drum 1 is set to be 0.15% faster than the circumferential speed of the intermediate transfer belt 11. For example, the target rotation speed of the photosensitive drum 1 is set, based on the PWM signal of the motor 41 and the PWM signal of the motor 42, so that the circumferential speed of the photosensitive drum 1 is faster than the circumferential speed of the intermediate transfer belt 11.

Figure 12:
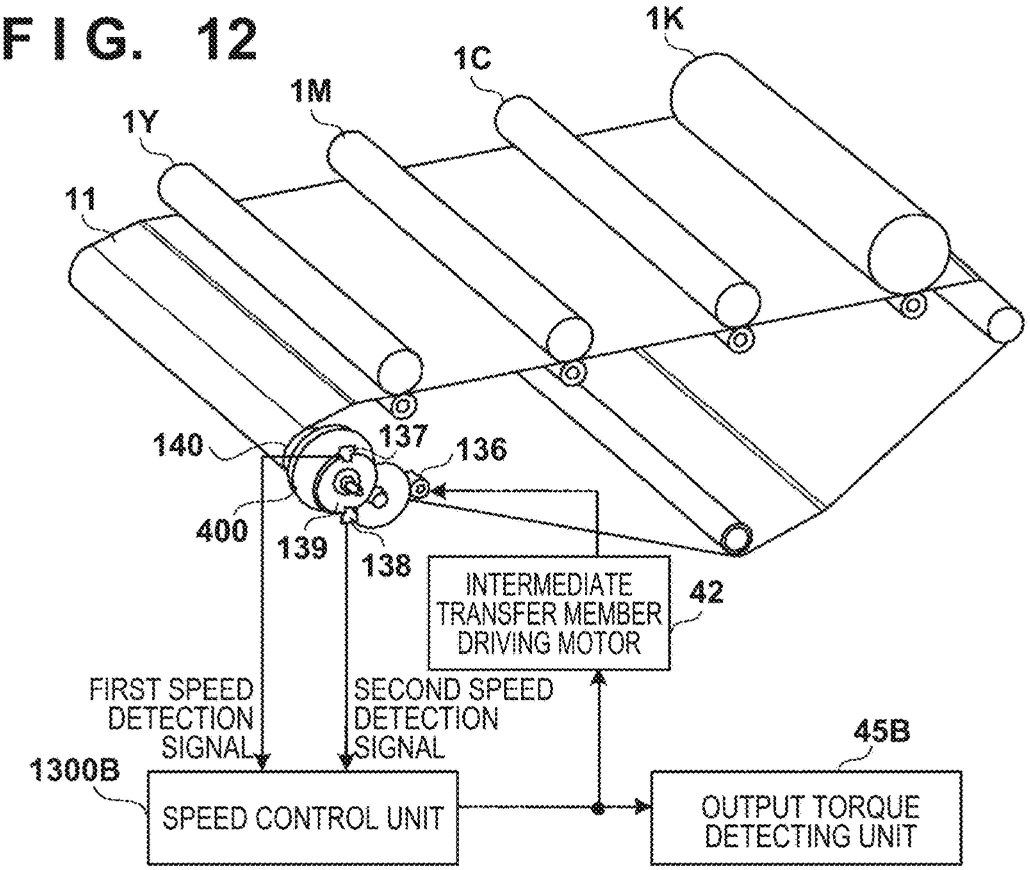
FIG. 12 is an explanatory view of an intermediate transfer member driving unit.

FIG. 12 is a view for explaining an intermediate transfer member driving unit that drives the intermediate transfer belt 11 rotationally. The intermediate transfer member driving unit is provided with a motor gear 136, a first speed detecting unit 137, a second speed detecting unit 138, an encoder 139, an intermediate transfer member driving roller 140, and a driving gear 400, and is driven by the motor 42. For the motor 42, a rotation speed is controlled by the speed control unit 1400.

Due to the driving by the motor 42, a driving force is transferred to an intermediate transfer member driving roller 140 via the motor gear 136 and the driving gear 400. The intermediate transfer member driving roller 140 is a rotation member for causing the intermediate transfer belt 11 to rotate by being rotationally driven. The encoder 139 is provided on the intermediate transfer member driving roller 140. The first speed detecting unit 137 and the second speed detecting unit 138 monitor rotation of the encoder 139. The first speed detecting unit 137 and the second speed detecting unit 138 detect the rotation speed of the intermediate transfer member driving roller 140 at different timings while the photosensitive drum 1 is performing one rotation. The first speed detecting unit 137 and the second speed detecting unit 138 respectively have the rotation speed of the intermediate transfer member driving roller 140 as first and second speed detection signals, and input these to the speed control unit 1400. The speed control unit 1400 generates a current value (a PWM signal) in accordance with the first and second speed detection signals, and inputs it to the motor 42. In other words, the speed control unit 1400 executes feedback control such that the rotation speed of the intermediate transfer member driving roller 140 becomes constant at the target speed.

The speed control unit 1400 also inputs a PWM signal to the output torque detecting unit 45B. The PWM signal represents power necessary for driving the intermediate transfer belt 11, and is a signal that is associated with the load torque of the motor 42. The load torque of the motor 42 represents the load torque of the intermediate transfer belt 11.

Friction of Contact Portions Between the Photosensitive Drum 1 and the Intermediate Transfer Belt 11

Figure 13:
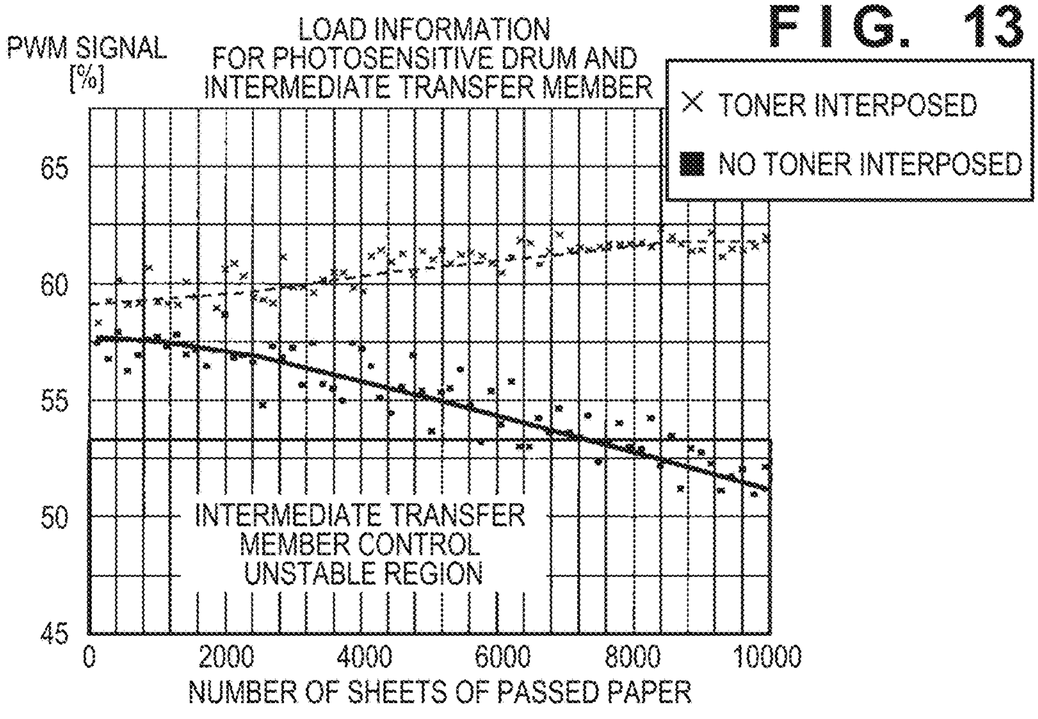
FIG. 13 is an explanatory view for change of load torque in accordance with a number of sheets of passed paper.

FIG. 13 is a view for explaining change of the load torque in accordance with a number of sheets of passed paper (a number of sheets on which images are formed) at the contact portion between the photosensitive drum 1 and the intermediate transfer belt 11. Note that the number of sheets of passed paper may be referred to as a number of print sheets.

A frictional force at the contact portion between the photosensitive drum 1 and the intermediate transfer belt 11 differs in accordance with whether a toner image is being formed on the photosensitive drum 1. If a toner image is being formed on the photosensitive drum 1, toner is interposed at the contact portion between the photosensitive drum 1 and the intermediate transfer belt 11. Therefore, even if the rotation speed of the photosensitive drum 1 and the rotation speed of the intermediate transfer belt 11 differ, the frictional force does not change much. If a toner image is not being formed on the photosensitive drum 1, toner is not interposed at the contact portion between the photosensitive drum 1 and the intermediate transfer belt 11. Therefore, if the rotation speed of the photosensitive drum 1 and the rotation speed of the intermediate transfer belt 11 differ, the frictional force is greatly influenced in accordance with the speed difference. In other words, as the speed difference increases, the frictional force increases.

As illustrated in FIG. 13, if a toner image is being formed on the photosensitive drum 1, change of the frictional force at the contact portion between the photosensitive drum 1 and the intermediate transfer belt 11 is small. In other words, if a toner image is being formed on the photosensitive drum 1, variation of the load torque is small. As a consequence, change of the duty ratio of the PWM signal is small. If a toner image is not being formed on the photosensitive drum 1, the frictional force of the contact portion between the photosensitive drum 1 and the intermediate transfer belt 11 increases. In other words, if a toner image is not being formed on the photosensitive drum 1, the load torque increases. The duty ratio of the PWM signal becomes lower in accordance with the increase of the load torque. The increase of the load torque causes control divergence due to the load torque ceasing to occur by the intermediate transfer belt 11 being pulled in the end. The photosensitive drum 1 becomes overloaded by the increase of the load torque.

The developer 3, even if it can only accommodate a small amount of toner internally, supplies toner to the photosensitive drum 1 in accordance with rotation of the developing agent carrier 16 at a time of developing. To suppress a toner consumption amount to the minimum necessary, it is required that the developing agent carrier 16 be caused to rotate only a minimum period necessary for image formation. Specifically, the developing agent carrier 16 starts rotating at a timing immediately prior to the image formation after the photosensitive drum 1 and the intermediate transfer belt 11 start rotating. The developing agent carrier 16 promptly stops rotating after image formation ends. As a consequence, the developing agent carrier 16 is often driven in a state where a toner image is not formed on the photosensitive drum 1. Therefore, there is the possibility of an overload of the photosensitive drum 1 or control divergence of the intermediate transfer belt 11 occurring when the developing agent carrier 16 is rotating.

The frictional force of the contact portion increases by the speed difference of the rotation speeds of the photosensitive drum 1 and the intermediate transfer belt 11 increasing. A frictional force between objects includes a static friction force and a kinetic friction force. The frictional force relating to the speed difference is a kinetic friction force. If a speed difference between objects is somewhat large, the kinetic friction force is a constant that is not affected by the speed difference. However, the speed difference between the photosensitive drum 1 and the intermediate transfer belt 11 is approximately 1% at most. As a consequence, the kinetic friction force between the photosensitive drum 1 and the intermediate transfer belt 11 changes by being influenced by the speed difference.

Figure 14:
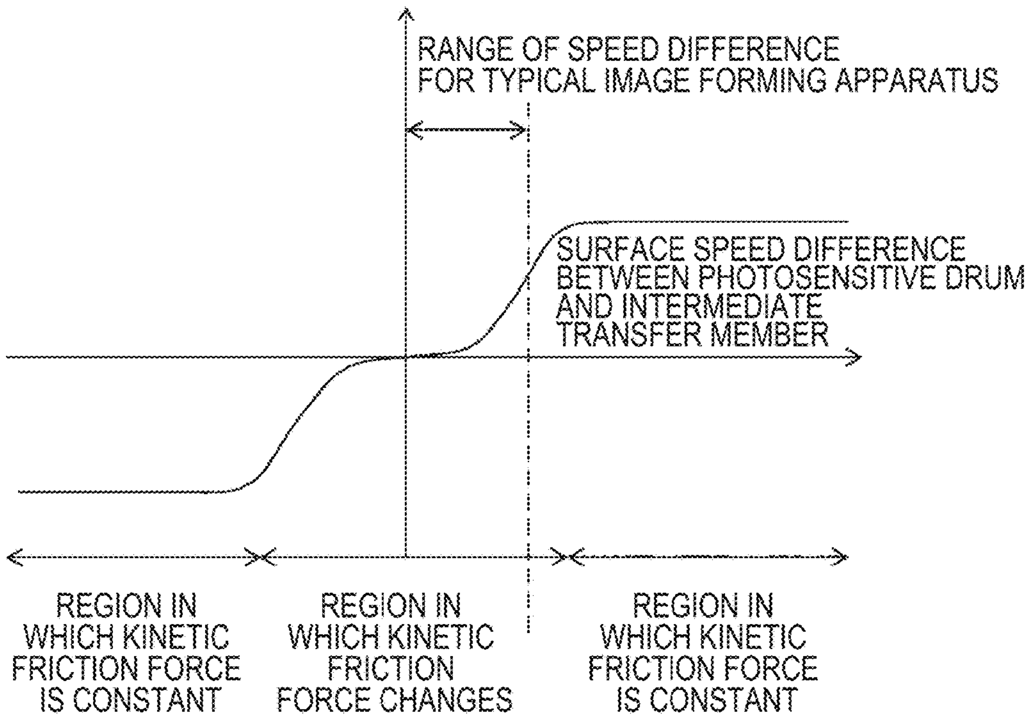
FIG. 14 is a view that represents a relationship between a kinetic friction force and a speed difference.

FIG. 14 is a view that represents such a relationship between a kinetic friction force and a speed difference. In an apparatus such as the image forming apparatus 100 where a speed difference between the rotation speeds of the photosensitive drum 1 and the intermediate transfer belt 11 is small, the kinetic friction force increases by the speed difference increasing.

Speed Adjustment Processing for the Photosensitive Drum 1 and the Intermediate Transfer Belt 11

Figure 15:
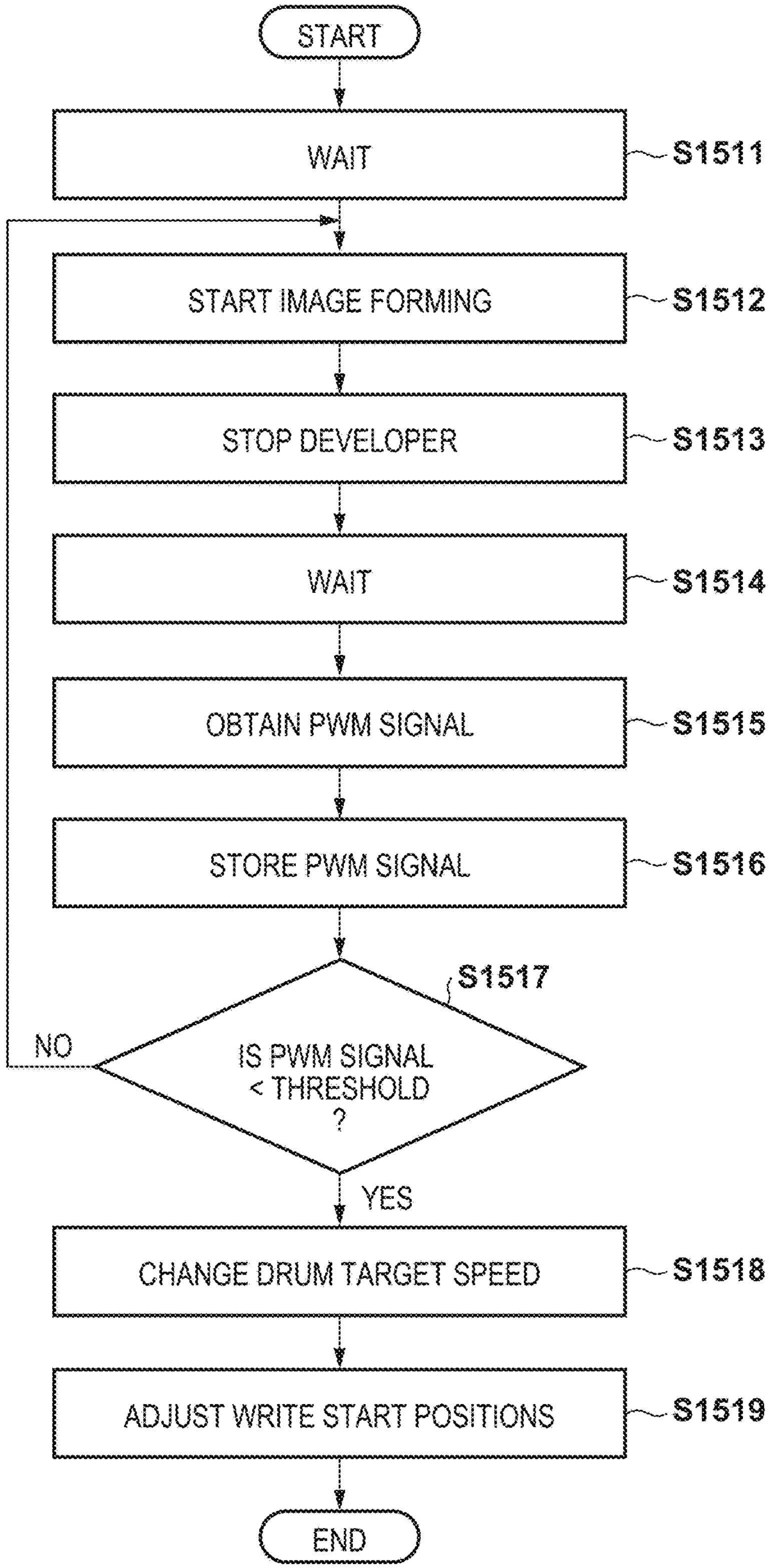
FIG. 15 is a flowchart that represents processing for adjusting a rotation speed.

FIG. 15 is a flowchart that represents adjustment processing of the rotation speed of the photosensitive drum 1.

In step S1511 the controller 1001 waits until it obtains an instruction for a start of image processing.

In step S1512, the controller 1001, having obtained an instruction for a start of image processing, starts image processing. Accordingly, driving of each unit of the image forming apparatus 100 is started. For example, rotation of the photosensitive drum 1 and the intermediate transfer belt 11 starts. At this point, rotation of the developing agent carrier 16 also starts, and a small amount of toner is supplied to the photosensitive drum 1 irrespective of the developing potential Vdc. By toner attaching to the photosensitive drum 1 and reaching the intermediate transfer belt 11, a frictional force at the contact portion between the photosensitive drum 1 and the intermediate transfer belt 11 becomes lower. While the developing agent carrier 16 is being driven in this way, the frictional force between the photosensitive drum 1 and the intermediate transfer belt 11 becomes lower. Thereby, an influence of a load torque is suppressed, and the photosensitive drum 1 and the intermediate transfer belt 11 are subject to stable drive control.

After image processing has ended, or in sheet-to-sheet processing, the controller 1001, in step S1513, stops operation of the developer 3. Accordingly, rotation of the developing agent carrier 16 also stops.

In step S1514, the controller 1001 waits until the developing agent carrier 16 completely stops and all toner that was supplied to the photosensitive drum 1 passes the intermediate transfer belt 11. A wait period is decided based on a drum diameter of the photosensitive drum 1, a position of the developing agent carrier 16, and a rotation speed of the photosensitive drum 1. In addition, a period for the toner transferred from the image forming unit 20Y to the intermediate transfer belt 11 to pass the position of the image forming unit 20K is 1.5 seconds, for example.

In step S1515, the controller 1001 obtains, by the output torque detecting unit 45B, a PWM signal representing a load torque of the intermediate transfer belt 11. Details of obtainment processing of the PWM signal are explained later.

In step S1516, the controller 1001 stores the obtained PWM signal in the memory 1005. The stored PWM signal is used as a backup value. The memory 1005 stores a maximum of 30 PWM signals. The controller 1001 updates the memory 1005 with the newest value as needed upon obtaining a 31st or subsequent PWM signal. Note that there is no need for the number of stored PWM signals to be 30 if there is a number sufficient to determine a load state.

In step S1517, the controller 1001 calculates an average value of the duty ratio of the PWM signals stored in the memory 1005, and compares with a threshold. In other words, the controller 1001 determines whether or not the average value of the duty ratio of the PWM signals is greater than the threshold. The controller 1001 repeatedly executes the processing of step S1512 through step S1516 until the average value becomes smaller than the threshold (step S1517: No). Accordingly, the state of the load torque is monitored at each timing when the photosensitive drum 1 and the intermediate transfer belt 11 do not have toner.

When the average value is less than the threshold (step S1517: Yes), the controller 1001 determines that there is a possibility of control divergence occurring for the intermediate transfer belt 11. In such a case, in step S1518, the controller 1001 changes the target speed of the rotation speed of the photosensitive drum 1, by the speed setting controller 1002. For example, the speed setting controller 1002 lowers the target rotation speed of the photosensitive drum 1 by 0.1%. Thereby, the difference between the circumferential speed of the photosensitive drum 1 and the circumferential speed of the intermediate transfer belt 11 decreases, and it is possible to suppress a shock that occurs at a contact region between the photosensitive drum 1 and the intermediate transfer belt 11. In the present embodiment, the color (chromatic color) photosensitive drums 1Y, 1M, and 1C have a different drum diameter to that of the black (achromatic color) photosensitive drum 1K. Because the drum diameters differ, a misalignment occurs at a write start position when forming an electrostatic latent image due to the target speed changing. As a consequence, the speed setting controller 1002, in step S1519, adjusts write start positions by setting different target speeds for the photosensitive drum 1K and photosensitive drums 1Y, 1M, and 1C in consideration of the difference in drum diameters. The controller 1001 may separately execute color registration described above in parallel with the change of the target speed.

In the above explanation the target speed of the rotation speed of the photosensitive drum 1 is changed, but the target speed of the rotation speed of the intermediate transfer belt 11 may be changed. In a case of changing the rotation speed of the intermediate transfer belt 11, enlargement or reduction of an image region will occur. As a consequence, in a case where enlargement or reduction of the image region cannot be tolerated, it is necessary to execute color registration, for example.

Next, explanation is given regarding the obtainment processing of the PWM signal of the intermediate transfer belt 11 in step S1515. In the present embodiment, the speed control unit 1400 generates the PWM signal of the intermediate transfer belt 11 by sampling a first detected speed and a second detected speed 36 times at 8 millisecond intervals over approximately 300 milliseconds, and taking averages thereof. The PWM signal of the intermediate transfer belt 11 changes in accordance with influences such as a variation of load of an intermediate transfer member driving unit when driving the intermediate transfer belt 11. Because a degree of such influence is understood by performing an FFT (Fast Fourier Transform) analysis of the PWM signal, the speed control unit 1400 can generate a PWM signal with good precision by cancelling values that have the highest influence. The controller 1001 obtains, by the output torque detecting unit 45, a PWM signal generated in this way.

When obtaining a PWM signal for the photosensitive drum 1, the speed control unit 1300 generates a PWM signal by similar processing. The sampling period described above is set for the photosensitive drum 1 to rotate once in approximately 300 milliseconds. The sampling period can be set shorter in a case of prioritizing a reduction of downtime or a case of increasing a number of PWM signals to obtain. The load torque may be obtained for at least one of the photosensitive drum 1 and the intermediate transfer belt 11.

Main factors for the occurrence of a load torque at a time of driving the intermediate transfer belt 11 are the frictional force due to the photosensitive drum 1 and the frictional force due to the transfer member cleaner 28. In the present embodiment, the load torque (the PWM signal) of the intermediate transfer belt 11 is measured in a state where toner is not interposed on the intermediate transfer belt 11 and rotation of the developing agent carrier 16 of the developer 3 is stopped.

The load torque of the intermediate transfer belt 11 changes between when toner is contained between the transfer member cleaner 28 and the intermediate transfer belt 11, and when it is not contained therebetween. To stabilize the rotation speed of the intermediate transfer belt 11, the photosensitive drum 1 is caused to rotate faster than the intermediate transfer belt 11. In such a case, the photosensitive drum 1 may pull the intermediate transfer belt 11 in accordance with the frictional force between the photosensitive drum 1 and the intermediate transfer belt 11, lightening the load torque of the intermediate transfer belt 11. As a consequence, it is desirable to obtain the load state of the intermediate transfer belt 11 when the load of the transfer member cleaner 28 is smaller.

When toner is contained between the transfer member cleaner 28 and the intermediate transfer belt 11, the frictional force between the intermediate transfer belt 11 and the transfer member cleaner 28 is reduced. Accordingly, the load torque of the intermediate transfer belt 11 decreases. The controller 1001 obtains the load torque (the PWM signal) of the intermediate transfer belt 11 in a state where toner is not interposed between the intermediate transfer belt 11 and the photosensitive drum 1 and where toner is contained between the transfer member cleaner 28 and the intermediate transfer belt 11. In the present embodiment, a period in which these two conditions align is present for approximately two seconds. Because the sampling period is approximately 300 milliseconds, there is sufficient time to obtain the PWM signal.

In the present embodiment, the photosensitive drum 1 is set so as to rotate faster than the intermediate transfer belt 11, but it is similar even if conversely the intermediate transfer belt 11 is set to rotate faster than the photosensitive drum 1. However, it is desirable to obtain the load of the intermediate transfer belt 11 at a timing when toner is not contained between the transfer member cleaner 28 and the intermediate transfer belt 11.

Figure 16:
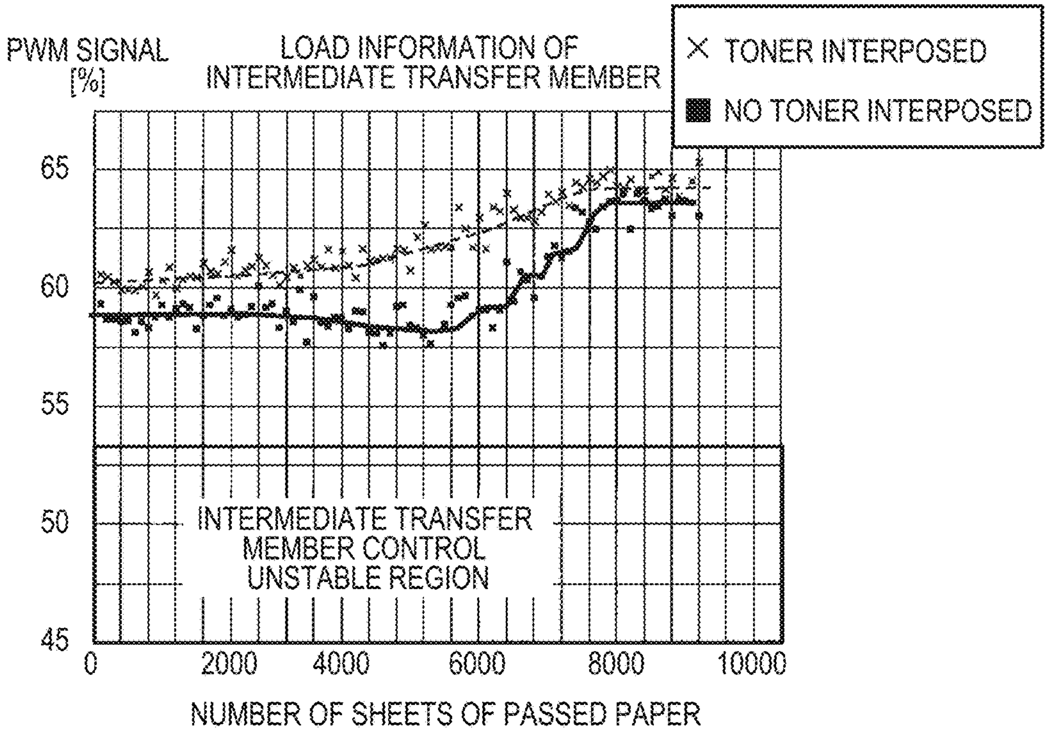
FIG. 16 is an explanatory view for change of load torque in accordance with a number of sheets of passed paper.

Explanation is given regarding change of the load torque of the intermediate transfer belt 11 when the target speed of the photosensitive drum 1 changes due to processing for adjusting the rotation speed as above. FIG. 16 is a view for explaining change of the load torque in accordance with a number of sheets of passed paper at the contact portion between the photosensitive drum 1 and the intermediate transfer belt 11 in this case. Even if the frictional force of the contact portion between the photosensitive drum 1 and the intermediate transfer belt 11 is large or if the frictional force increases in accordance with aging, the intermediate transfer belt 11 is capable of being driven stably without control divergence.

Note that, in the present embodiment, the controller 1001 obtains, as load torques for the motors 41 and 42, PWM signals for controlling the motor 41 and the motor 42. In addition, the controller 1001 may obtain the load torques in accordance with input currents to the motor 41 and the motor 42 which are in roughly proportional relationships with the characteristics of the same load torques.

Obtaining the Load Torque of the Photosensitive Drum 1

If the load torque of the photosensitive drum 1 increases, there is a possibility of control divergence of the photosensitive drum 1 occurring. In such a case, the controller 1001 obtains the load torque of the intermediate transfer belt 11, and the load torque of the photosensitive drum 1.

When obtaining the load torque of the photosensitive drum 1, if the state is such that no toner is present on the photosensitive drum 1 of the target image forming unit 20, it is possible to obtain the load torque without involving the other image forming units 20. The controller 1001 is capable of the obtaining in a period necessary to enter the state in which toner is not present on the photosensitive drum 1 of the target image forming unit 20. Therefore, it is possible to increase the number of obtainment timings.

Main factors for the load torque changing at a time of driving the intermediate transfer belt 11 are the frictional force due to the photosensitive drum 1 and the frictional force due to the drum cleaner 26. In the present embodiment, the load torque (the PWM signal) of the photosensitive drum 1 is measured in a state where the developer 3 is stopped and no toner is interposed on the photosensitive drum 1.

The load torque of the motor 41 changes between when toner is contained between the drum cleaner 26 and the photosensitive drum 1, and when it is not contained therebetween. To stabilize the rotation speed of the photosensitive drum 1, the photosensitive drum 1 is caused to rotate faster than the intermediate transfer belt 11. In such a case, it is desirable to obtain the load torque of the photosensitive drum 1 in a state where the drum cleaner 26 is not reducing the load torque (the frictional force) of the photosensitive drum 1.

When toner is contained between the drum cleaner 26 and the photosensitive drum 1, the frictional force between the photosensitive drum 1 and the drum cleaner 26 is reduced. Accordingly, the load torque of the photosensitive drum 1 decreases. The controller 1001 obtains the load torque (the PWM signal) of the photosensitive drum 1 in a state where toner is not interposed between the intermediate transfer belt 11 and the photosensitive drum 1 and where toner is not contained between the drum cleaner 26 and the photosensitive drum 1. In a case of simultaneously obtaining the load torque of the intermediate transfer belt 11, the controller 1001 obtains this load torque immediately before toner between the transfer member cleaner 28 and the intermediate transfer belt 11 ceases to be contained therebetween.

In the present embodiment, the photosensitive drum 1 is set so as to rotate faster than the intermediate transfer belt 11, but it is similar even if conversely the intermediate transfer belt 11 is set to rotate faster than the photosensitive drum 1. However, it is desirable to obtain the load torque of the intermediate transfer belt 11 at a timing when toner is contained between the drum cleaner 26 and the photosensitive drum 1.

Thus, even if the frictional force of the contact portion between the photosensitive drum 1 and the intermediate transfer belt 11 is large or if the frictional force increases in accordance with aging, the photosensitive drum 1 is capable of being driven stably without control divergence.

Image Forming Mode

The image forming apparatus 100 can be set with an image forming mode for forming a color image (a mixed-color image), and an image forming mode for forming an image in a black monochrome (a monochrome image). A high-speed color image forming apparatus for an office is frequently used in an image forming mode for forming images in a black monochrome. Therefore, the durability of a configuration for forming a black image (the image forming unit 20K) is high. In such a case, a configuration that does not cause a configuration for forming a color image (the image forming units 20Y, 20M, and 20C) to degrade is provided in the image forming apparatus 100. The controller 1001 (the CPU 1000) is a mode control unit for controlling the image forming units 20 based on the image forming mode designated in a print job of the image forming apparatus 100.

Using FIG. 1A and FIG. 1B again, an explanation of a relationship between the photosensitive drum 1 and the intermediate transfer belt 11 in accordance with the image forming mode is given. FIG. 1A represents a relationship between the photosensitive drum 1 and the intermediate transfer belt 11 at a time of the image forming mode for forming a color image. FIG. 1B represents a relationship between the photosensitive drum 1 and the intermediate transfer belt 11 at a time of the image forming mode for forming a black monochrome image.

For a time of the image forming mode for forming a color image (a mixed-color image), the primary transfer rollers 8Y, 8M, and 8C and the auxiliary roller 9*a* move toward the photosensitive drums 1Y, 1M, and 1C. Accordingly the photosensitive drums 1Y, 1M, 1C, and 1K contact the intermediate transfer belt 11. For a time of the image forming mode for forming a black monochrome image, the primary transfer rollers 8Y, 8M, and 8C and the auxiliary roller 9*a* separate from the photosensitive drums 1Y, 1M, and 1C, and the auxiliary roller 9*b* moves toward the photosensitive drum 1. Accordingly the photosensitive drum 1K contacts the intermediate transfer belt 11, and the photosensitive drums 1Y, 1M, and 1C separate from the intermediate transfer belt 11.

In the image forming mode for forming a black monochrome image (a monochrome image) (FIG. 1B), there are cases where an influence of a secondary transfer unit shock appears in an image due to the nipping pressure between the photosensitive drum 1K and the primary transfer roller 8K, in accordance with the type of a sheet onto which the image is formed. For example, if the grammage of the sheet is less than 150 [g/m^2], the controller 1001 forms a black monochrome image in a state where the photosensitive drums 1Y, 1M, and 1C are caused to be separated from the intermediate transfer belt 11, as illustrated in FIG. 1B. Meanwhile, if the grammage of the sheet is greater than or equal to 150 [g/m^2], the controller 1001 causes the intermediate transfer belt 11 to be nipped between the photosensitive drums 1Y, 1M, and 1C and the primary transfer rollers 8Y, 8M, and 8C, as illustrated in FIG. 1A, irrespective of the image forming mode. At this point, the photosensitive drums 1Y, 1M, and 1C rotate idly. In addition, rotation of the developing agent carriers 16 of the developers 3Y, 3M, and 3C is stopped.

Accordingly, toner is not supplied to the photosensitive drums 1Y, 1M, and 1C, and frictional forces between the photosensitive drums 1Y, 1M, and 1C and the intermediate transfer belt 11 become greater. The frictional forces between the drum cleaners 26Y, 26M, and 26C and the photosensitive drums 1Y, 1M, and 1C become greater because the drum cleaners 26Y, 26M, and 26C do not contain toner. As a consequence, a possibility of control divergence occurring for any of the photosensitive drums 1Y, 1M, and 1C and the intermediate transfer belt 11 arises.

Figure 17:
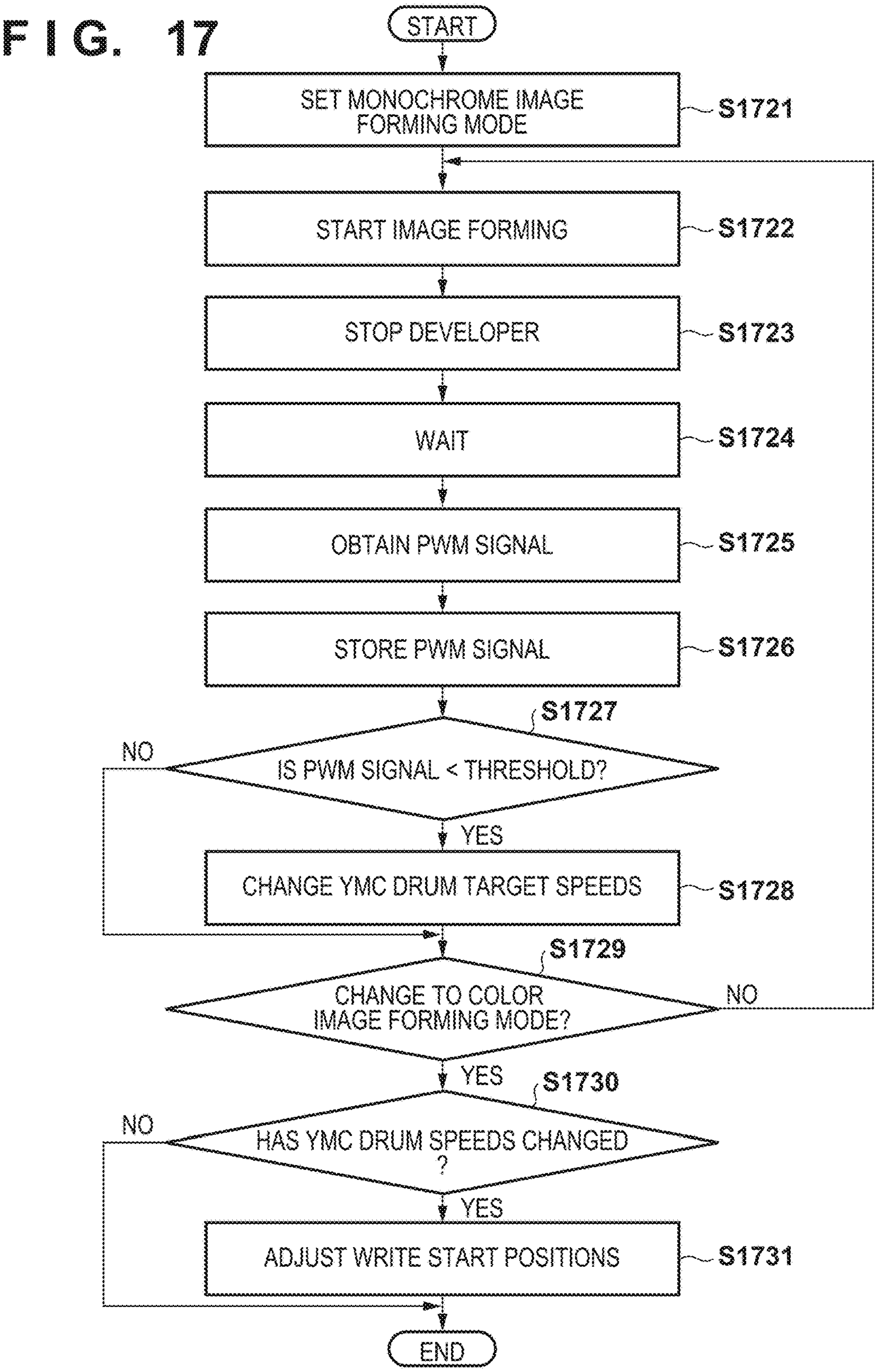
FIG. 17 is a flowchart for a black image forming mode.

To avoid this, as in the flowchart illustrated in FIG. 17, the controller 1001 adjusts the target rotation speed of the motor 41 based on the PWM signal of the intermediate transfer belt 11 so that the load torque does not become a value for which there is a possibility of control divergence occurring. The controller 1001 changes the target speed of the rotation speed of the photosensitive drums 1Y, 1M, and 1C if the load torque has fallen below a threshold for which divergence is possible. Note that the controller 1001 obtains in advance load characteristics for a time where toner is not present on the photosensitive drums 1Y, 1M, and 1C, and based on these decides the target speed of the rotation speed of the photosensitive drums 1 in the image forming mode for forming a black monochrome image. In the present embodiment, the target rotation speed of the photosensitive drum 1K for forming a black image is not changed. In a specific case where only the photosensitive drum 1K performs image formation, by changing the rotation speed of the other photosensitive drums 1Y, 1M, and 1C, control divergence of the other photosensitive drums 1Y, 1M, and 1C and the intermediate transfer belt 11 is prevented.

The image forming mode in which the image forming apparatus 100 forms a black monochrome image in a state where the photosensitive drums 1Y, 1M, 1C, and 1K are caused to be in contact with the intermediate transfer belt 11 is explained based on the flowchart of FIG. 17. In a case of forming a black monochrome image, the CPU 1000 reads out a program stored in the memory 1005, and executes processing for the flowchart of FIG. 17.

In step S1721, the CPU 1000 sets the image forming mode of the image forming apparatus 100 to a mode for forming a black monochrome image. For example, in the processing of step S1721, the CPU 1000 sets the target speeds of the photosensitive drums 1Y, 1M, 1C, and 1K. Furthermore, the CPU 1000 sets the target speed of the intermediate transfer belt 11.

In step S1722, the CPU 1000 causes the image forming unit 20K to form a black monochrome image based on image data. After finishing forming a black image based on the image data, the CPU 1000 advances the processing to step S1723.

In step S1723, the CPU 1000 causes the image forming unit 20K to stop rotation of the developing agent carrier 16.

In step S1724, the CPU 1000 waits a predetermined period. The predetermined period corresponds for a period for toner supplied to the photosensitive drum 1 to pass the intermediate transfer belt 11.

Subsequently, in step S1725 the CPU 1000 obtains values of the PWM signal of the motor 42. For example, in the processing of step S1725, the CPU 1000 obtains PWM signals detected by the output torque detecting unit 45B. The output torque detecting unit 45B inputs PWM signals representing the load torque of the motor 42 to the CPU 1000.

In step S1726, the CPU 1000 stores PWM signal values in the memory 1005.

Next, in step S1727, the CPU 1000 determines whether an average value of the PWM signal values is greater than a threshold. Here, when the circumferential speed of the intermediate transfer belt 11 changes due to the rotation speed of the photosensitive drums 1Y, 1M, 1C, and 1K, the load torque of the motor 42 gradually becomes lower. Specifically, the PWM signal values detected by the output torque detecting unit 45B become lower. In the processing of step S1727, the CPU 1000 compares the PWM signal values with the threshold, and if the PWM signal values is less than the threshold, determines that the load torque of the motor 42 is gradually becoming lower. If the PWM signal values are less than the threshold in processing of step S1727, the CPU 1000 advances the processing to step S1728.

In step S1728, the CPU 1000 lowers the rotation speed of the photosensitive drums 1Y, 1M, and 1C to cause the load of the intermediate transfer belt 11 to decrease. For example, the speed setting controller 1002 lowers the target rotation speed of the photosensitive drum 1 by 0.1%. Thereby, the difference between the circumferential speed of the photosensitive drum 1 and the circumferential speed of the intermediate transfer belt 11 decreases, and it is possible to suppress a shock that occurs at a contact region between the photosensitive drum 1 and the intermediate transfer belt 11. In the processing of step S1728, the CPU 1000 changes the setting of the target speed for the speed control units 1300Y, 1300M, and 1300C so that the rotation speed of the photosensitive drums 1Y, 1M, and 1C becomes lower by only a predetermined value.

In step S1729, the CPU 1000 determines whether a change has been made to the color image forming mode. For example, the CPU 1000 determines whether image data for a color image has been transferred. If image data for a color image has not been inputted, the CPU 1000 transitions to the processing of step S1722.

In addition, if the PWM signal values are greater than or equal to the threshold in the processing of step S1727, the CPU 1000 transitions to the processing of step S1729 without changing the rotation speed of the photosensitive drums 1Y, 1M, and 1C. In the processing of step S1729, when image data of a color image has been inputted, the CPU 1000 advances to step S1730.

In step S1730, the CPU 1000 determines whether a change of the target speed of the photosensitive drums 1Y, 1M, and 1C has been performed. In other words, it is determined whether the rotation speed of the photosensitive drums 1Y, 1M, and 1C was changed in the processing of step S1728. If the target rotation speed has not been changed, the CPU 1000 sets the image forming mode of the image forming apparatus 100 to the color image forming mode.

Meanwhile, if the rotation target speed of the photosensitive drums 1Y, 1M, and 1C was changed in the processing of step S1728, the processing advances to step S1731.

In step S1731, the CPU 1000 executes an adjustment of a write start position. Note that, when transitioning to an image forming mode for forming a color image, it is desirable for the controller 1001 to have the target rotation speeds for each of the photosensitive drums 1Y, 1M, and 1C remain unchanged. This is because the frictional force between the photosensitive drum 1 and the intermediate transfer belt 11 continues to be maintained in a raised state even when the image forming mode for color images has been entered. In such a case, a misalignment between the rotation speeds of each of the photosensitive drums 1Y, 1M, and 1C and the rotation speed of the photosensitive drum 1K occurs. To correct this, the controller 1001 performs color registration as described above, and changes the write start position of an electrostatic latent image to the photosensitive drum 1 by the exposure unit 2. Accordingly, the misalignment of a position for forming a toner image due to the misalignment of the rotation speeds is corrected for.

In this way, even in a case of changing the rotation speed of the photosensitive drum 1 by processing in accordance with the image forming mode, the image forming apparatus 100 can set an appropriate optimal target speed. Independent of the frictional force between the photosensitive drum 1, and the intermediate transfer belt 11, the photosensitive drum 1 and the intermediate transfer belt 11 are stably driven without suffering control divergence.

Explanation was given for various embodiments above. Technical concepts such as the following are derived from these embodiments.

The image forming apparatus 100 is an image forming apparatus that has an intermediate transfer member, and transfers an image on the intermediate transfer member to a sheet. The black image forming unit 20K is a first image forming unit that has a first photosensitive member, and uses toner of a first color to form a first image on the first photosensitive member. The yellow image forming unit 20Y, the magenta image forming unit 20M, and the cyan image forming unit 20C are examples of a second image forming unit that has a second photosensitive member and uses toner of a second color different from the first color to form a second image on the second photosensitive member. The driving circuit 31 is an example of a driving control unit that controls a rotation speed of the second photosensitive member. The primary transfer roller 8K is an example of a first transferring member that forms a first transferring nip portion for transferring the first image formed on the first photosensitive member to the intermediate transfer member. The primary transfer rollers 8Y, 8M, and 8C are each an example of a second transferring member that forms a second transferring nip portion for transferring the second image formed on the second photosensitive member to the intermediate transfer member. The CPU 30 is an example of a controller that controls a mechanism for causing contact and separation of the second photosensitive member and the intermediate transfer member. When the mechanism is controlled to enter a first state, the intermediate transfer member is separated from the second photosensitive member. When the mechanism is controlled to enter a second state, the intermediate transfer member contacts with the second photosensitive member. The CPU 30 controls the mechanism to enter the first state in a case in which a first monochrome image is formed on a sheet of a first type by using toner of the first color. The CPU 30 controls the mechanism to enter the second state in a case in which a second monochrome image is formed on a sheet of a second type different from first type by using toner of the first color. The CPU 30 or the driving circuit 31 controls a rotation speed of the second photosensitive member for forming the second monochrome image on the sheet of the second type to be a predetermined rotation speed. The predetermined rotation speed is slower than a rotation speed of the second photosensitive member for forming the second image.

A grammage of a sheet of the first type is less than or equal to a predetermined value, and a grammage of a sheet of the second type is greater than the predetermined value. The CPU 30 obtains information relating to a grammage of a sheet, and controls the mechanism based on this information.

The intermediate transfer member rotates based on a target rotation speed. A circumferential speed difference between the second photosensitive member and the intermediate transfer member in a state where the second photosensitive member is rotating based on the predetermined rotation speed is smaller than a circumferential speed difference between the second photosensitive member and the intermediate transfer member for forming the second image.

A first sensor for detecting the rotation speed of the first photosensitive member and a second sensor for detecting the rotation speed of the second photosensitive member may be provided in the image forming apparatus 100. The rotation speed of the first photosensitive member is subject to feedback control based on a detection result by the first sensor. The rotation speed of the second photosensitive member is subject to feedback control based on a detection result by the second sensor.

The intermediate transfer member rotates based on a target rotation speed. The circumferential speed of the first photosensitive member for forming the first image is faster than the circumferential speed of the intermediate transfer member. The circumferential speed of the first photosensitive member for forming the first image is slower than the circumferential speed of the intermediate transfer member.

A motor for rotating the intermediate transfer member and a sensor for detecting the rotation speed of the intermediate transfer member may be provided in the image forming apparatus 100. A driving control unit executes feedback control based on a detection result of the sensor to control the rotation speed of the motor. The driving control unit controls, based on a load torque of the motor, whether to change the rotation speed of the second photosensitive member while a plurality of the second monochrome image are formed on (a plurality of) sheets of the second type. The driving control unit may control whether to change the rotation speed of the second photosensitive member based on a load torque of a period in which the plurality of the second monochrome image are formed on the plurality of sheets of the second type. The driving control unit may control whether to change the rotation speed of the second photosensitive member based on a load torque of a predetermined period included in this period. The predetermined period is a period in which a sleeve for supplying toner to the first photosensitive member has stopped rotation. The driving control unit may control, based on power supplied to the motor, whether to change the rotation speed of the second photosensitive member in a case where the second monochrome image is formed on a sheet of the second type. The driving control unit may control whether to change the rotation speed of the second photosensitive member based on power of a period in which the plurality of the second monochrome image are formed on the plurality of sheets of the second type. The driving control unit may control whether to change the rotation speed of the second photosensitive member based on power of a predetermined period included in this period. The predetermined period is a period in which a sleeve for supplying toner to the first photosensitive member has stopped rotation. The driving control unit may lower the rotation speed of the second photosensitive member if the power in the predetermined period is less than a threshold.

The image forming apparatus 100 may further have a detection unit for detecting a test image, used in color registration, that is formed on the intermediate transfer member. The first image forming unit and the second image forming unit form a test image before a mixed-color image is formed when the driving control unit has changed the rotation speed of the second photosensitive member. The color registration is control for correcting relative positions between a first image to be formed by the first image forming unit and a second image to be formed by the second image forming unit. The driving control unit may additionally control the rotation speed of the first photosensitive member. The circumferential speed of the first photosensitive member is faster than the circumferential speed of the intermediate transfer member. The circumferential speed of the first photosensitive member is slower than the circumferential speed of the intermediate transfer member.

The driving control unit controls a rotation speed of the first photosensitive member for forming the second monochrome image on the sheet of the second type to be a target rotation speed. The driving control unit controls a rotation speed of the first photosensitive member for forming a mixed-color image on a sheet of the second type to a target rotation speed.

The first color may correspond to black, and the second color may correspond to a chromatic color.

Other Embodiments

Embodiment(s) of the present invention can also be realized by a computer of a system or apparatus that reads out and executes computer executable instructions (e.g., one or more programs) recorded on a storage medium (which may also be referred to more fully as a 'non-transitory computer-readable storage medium') to perform the functions of one or more of the above-described embodiment(s) and/or that includes one or more circuits (e.g., application specific integrated circuit (ASIC)) for performing the functions of one or more of the above-described embodiment(s), and by a method performed by the computer of the system or apparatus by, for example, reading out and executing the computer executable instructions from the storage medium to perform the functions of one or more of the above-described embodiment(s) and/or controlling the one or more circuits to perform the functions of one or more of the above-described embodiment(s). The computer may comprise one or more processors (e.g., central processing unit (CPU), micro processing unit (MPU)) and may include a network of separate computers or separate processors to read out and execute the computer executable instructions. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD)™), a flash memory device, a memory card, and the like.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

What is claimed is:

1. An image forming apparatus comprising:

a first image forming unit having a first photosensitive drum that rotates, the first image forming unit configured to form a first image on the first photosensitive drum by using black toner;

a second image forming unit having a second photosensitive drum that rotates, the second image forming unit configured to form a second image on the second photosensitive drum by using chromatic color toner;

an intermediate transfer member on which the first image and the second image are transferred;

a transfer member configured to transfer the first image and the second image from the intermediate transfer member to a sheet;

a motor configured to rotate the intermediate transfer member;

a controller configured to:

control the intermediate transfer member in a first mode in which the intermediate transfer member contacts the first photosensitive drum and the second photosensitive drum, and control the intermediate transfer member in a second mode in which the intermediate transfer member contacts the first photosensitive drum and separates from the second photosensitive drum, wherein, in a case where a black monochrome image is formed on the sheet in the first mode, the controller controls, based on data related to a load torque of the motor, a target rotation speed of the second photosensitive drum for mixed-color image forming.

2. The image forming apparatus according to claim 1, wherein the controller obtains information related to a grammage of the sheet, the controller controls the intermediate transfer member to be in the first mode, in a case where the grammage of the sheet is greater than a predetermined grammage, and the controller controls the intermediate transfer member to be in the second mode, in a case where the grammage of the sheet is less than the predetermined grammage.

3. The image forming apparatus according to claim 1, wherein the controller controls whether or not to change the target rotation speed of the second photosensitive drum for the mixed-color image forming based on the data.

4. The image forming apparatus according to claim 1, wherein the data includes a motor signal dependent on a load torque of the motor, and in a case where a value of the motor signal is less than a threshold value, the controller changes the target rotation speed of the second photosensitive drum for the mixed-color image forming.

5. The image forming apparatus according to claim 1, wherein a circumferential speed of the second photosensitive drum in the first mode is greater than or equal to a circumferential speed of the intermediate transfer member in the first mode.

6. The image forming apparatus according to claim 1, wherein a circumferential speed of the second photosensitive drum in the first mode is less than or equal to a circumferential speed of the intermediate transfer member in the first mode.

7. The image forming apparatus according to claim 1, wherein a circumferential speed of the second photosensitive drum for forming the black monochrome image in the first mode is less than or equal to a circumferential speed of the second photosensitive drum for mixed-color image forming in the first mode.

8. The image forming apparatus according to claim 1, further comprising:

a first sensor configured to detect a rotation speed of the first photosensitive drum; and a second sensor configured to detect a rotation speed of the second photosensitive drum, wherein the rotation speed of the first photosensitive drum is feedback controlled based on a detection result by the first sensor, and wherein the rotation speed of the second photosensitive drum is feedback controlled based on a detection result by the second sensor.

9. The image forming apparatus according to claim 1, wherein the second image forming unit has a sleeve that rotates for supplying toner to the second photosensitive drum, the controller obtains the data at a predetermined period, and the predetermined period includes a period in which rotation of the sleeve stops.

10. The image forming apparatus according to claim 1, further comprising:

a sensor configured to detect a test image formed by the first image forming unit and the second image forming unit, the test image is used for detecting color misregistration, and the controller corrects the color misregistration based on the detecting result of the sensor before the mixed-color image forming, in a case where the target rotation speed is changed.

* * * * *